(12) United States Patent
Kobayashi

(10) Patent No.: US 6,740,860 B2
(45) Date of Patent: May 25, 2004

(54) PHOTODETECTOR, PHOTOSENSING POSITION DETECTOR, COORDINATE INPUT DEVICE, COORDINATE INPUT/OUTPUT APPARATUS, AND PHOTODETECTION METHOD

(75) Inventor: Kiwamu Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 09/990,340

(22) Filed: Nov. 23, 2001

(65) Prior Publication Data

US 2002/0067341 A1 Jun. 6, 2002

(30) Foreign Application Priority Data

Dec. 6, 2000 (JP) ........................................ 2000-371408
Dec. 6, 2000 (JP) ........................................ 2000-371409

(51) Int. Cl.⁷ ............................................. H01L 31/00
(52) U.S. Cl. ..................................... 250/214.1; 250/221
(58) Field of Search .............................. 250/214.1, 221, 250/208.1, 559.29, 227.22; 345/163, 166, 173, 175, 179; 340/870.16, 870.2; 356/222, 226

(56) References Cited

U.S. PATENT DOCUMENTS 5,808,726 A    9/1998   Egawa et al. ............... 356/3.06
6,642,495 B2 * 11/2003   Lowrance et al. ........ 250/208.1

FOREIGN PATENT DOCUMENTS

JP            8233571            9/1996

* cited by examiner

*Primary Examiner*—Que T. Le
(74) *Attorney, Agent, or Firm*—Fitzpatrick, Cella, Harper & Scinto

(57) ABSTRACT

A photodetector includes a photoreceiving unit which receives a light beam that blinks a plurality of times per detection period and coverts the received light beam into an output signal. A signal processing and control unit controls the photoreceiving unit so that the output signal increases in strength as a blinking cycle count increases in each detection period.

18 Claims, 30 Drawing Sheets

Ax : X DIRECTION PARAMETER

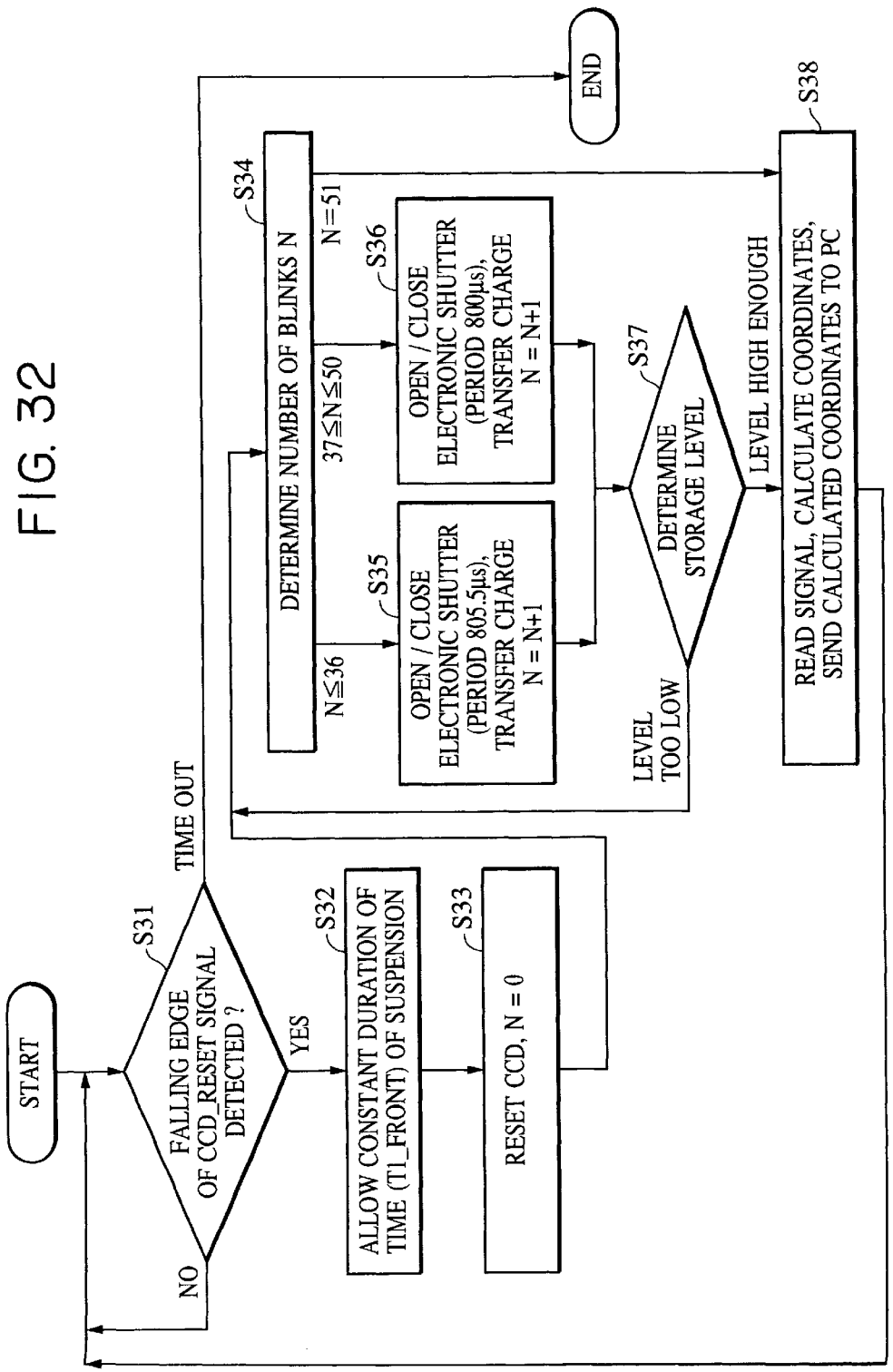

PHOTODETECTOR, PHOTOSENSING POSITION DETECTOR, COORDINATE INPUT DEVICE, COORDINATE INPUT/ OUTPUT APPARATUS, AND PHOTODETECTION METHOD

BACKGROUND OF THE INVENTION

1. Field of the Invention

The present invention relates to a photodetector, a photosensing position detector, a coordinate input device, a coordinate input/output device, and a photodetection method.

2. Description of the Related Art

Some known coordinate input devices input two-dimensional coordinates on a screen of a large-scale display device by using a pointer, thereby entering drawings, characters or commands for controlling a system to an externally connected CPU (Central Processing Unit). Another known coordinate input device inputs three-dimensional coordinates by manipulating a pointer in a three-dimensional space, thereby entering a path of three-dimensional motion, information of the presence of an object, or commands for controlling a system.

Specifically, a coordinate input device for a large-scale display picks up a light spot on a screen using a CCD area sensor or a CCD linear sensor, and determines the position of the focused light spot on the sensor screen in response to an output signal thereof. The two-dimensional coordinates of the position on the screen are thus obtained. In yet another known coordinate input device, a plurality of position detector elements (a device that results in an analog output voltage in response to the position of the spot) are used to determine a two-dimensional coordinate position on the screen using the magnitude of the analog voltage or the ratio of the analog voltage.

The following three-dimensional coordinate input devices are known.

1) A coordinate input device that detects a three-dimensional motion or position by sensing a mechanical touch, mechanical deformation, or a kinetic acceleration with a sensor supported by a multi-articulate mechanism.

2) A coordinate input device that provides three-dimensional inputs by combining two-dimensional inputs from a joystick, etc.

3) A coordinate input device that determines three-dimensional input information by obtaining a stereo image with a plurality of video cameras sensitive to visible light or infrared light, and by processing the stereo image.

These coordinate input devices have to achieve the following goals.

A first goal to be addressed is to exclude the influence of interfering external light that has adverse effects in the determination of precise coordinates and a stable operation of the device.

The diversification of display types, the availability of infrared light as a wireless communication means, and the widespread use of infrared remote controllers makes infrared light ubiquitous in the environment where coordinate input devices are operated. There is a need for effective interfering light removal means.

A second goal is to achieve a wide dynamic range of receivable light. In the coordinate input device of the type that a user inputs coordinates by directing a light beam using a pointer, the amount of directed light greatly changes depending on the manipulation of the pointer (specifically, depending on the position of, the alignment of, and the speed of motion of the pointer). When the pointer is operated from a battery, the amount of directed light greatly varies depending on power remaining in the battery. The coordinate input device therefore needs photoreceving means having a wide dynamic range.

In this type of conventional coordinate input device, a light spot on a screen or in a three-dimensional space is picked up using a CCD area sensor or a CCD linear sensor, the focused position of the light spot on the sensor is determined from the output signal therefrom, and two-dimensional coordinates on the screen or three-dimensional coordinates in the three-dimensional space are thus determined. This conventional coordinate input device uses an optical filter for allowing light within a particular wavelength band to be transmitted as a means for removing interfering light. Tracking means for tracking variations in an amount of light is virtually unavailable. This means that the dynamic range of the device is narrow.

In another known coordinate input device, a plurality of position detector elements (a device that results in an analog output voltage in response to the position of the spot) is used to determine a two-dimensional coordinate position on the screen or a three-dimensional position in a work space using the magnitude of the analog voltage or the ratio of the analog voltage. This conventional coordinate input device uses an optical filter for allowing light within a particular wavelength band to be transmitted as a means for removing interfering light. Since means for detecting a received signal as coordinate information is used, tracking means for tracking variations in an amount of light is virtually unavailable.

The present invention provides a novel method for expanding dynamic range.

SUMMARY OF THE INVENTION

It is an object of the present invention to provide a photosensing position detector, a coordinate input device, and a coordinate input/output apparatus, each having a wide dynamic range.

A photodetector of the present invention includes a photoreceiving unit for receiving a light beam that blinks a plurality of times per detection period and converting the received light beam into a signal, and a signal processing and controlling unit for controlling the photoreceiving unit so that the signal that is output in response to the received light beam per blinking cycle of the light beam increases in strength as a blinking cycle count increases in each detection period.

A photosensing position detector of the present invention includes a line sensor, formed of pixels arranged in a line, for receiving a light beam that blinks a plurality of times per detection period, a signal processing and controlling unit which controls the line sensor so that the output signal of the line sensor in response to the received light beam per blinking cycle of the light beam increases in strength as the blinking cycle count increases in each detection period, and a determining unit which determines, as a photosensing position, the position of a pixel that generates a maximum value of the output signal.

Other features and advantages of the present invention will be apparent from the following description in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 32 is a flow diagram showing the timing sequence 2 in the second example of the first embodiment of the present invention.

DESCRIPTION OF THE PREFERRED EMBODIMENTS

Figure 1:
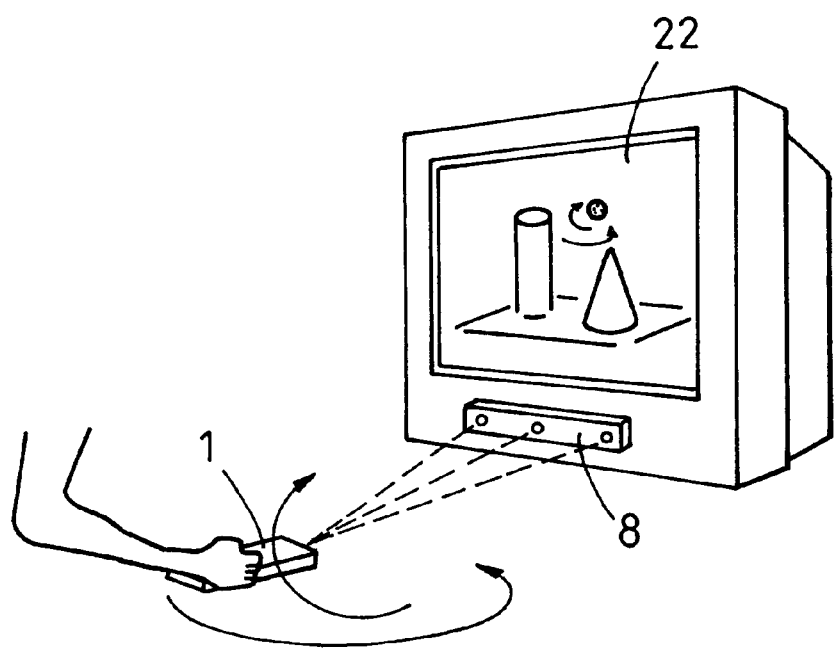
FIG. 1 shows the concept of a coordinate input device in accordance with a first embodiment of the present invention.

Preferred embodiments of the present invention are described in detail below in accordance with the accompanying drawings.

The embodiments of the present invention of a coordinate input device are discussed in detail. The present invention is implemented not only as a coordinate input device, but also as a photosensing position detector as is discussed later.

First Embodiment

Since the present invention is based on improvements to the already-mentioned known device, the known devices are discussed first and then a "coordinate input device" as a first embodiment of the present invention will be discussed. Since the coordinate input device of the present invention calculates coordinates, and outputs the calculated coordinate position to a display device to present the coordinate position on the screen thereon, the coordinate input device may also be called a coordinate input/output apparatus.

The known devices relate to a coordinate input device in which a pointer as a light source is pointed in an appropriate direction in a work space, or a predetermined position is pointed on a coordinate input screen using a pointer. A plurality of coordinate detectors detects light directed on a photosensor unit by the pointer, and generates a three-dimensional position signal within the work space or a coordinate output signal on the coordinate input screen.

The known devices include a pointer including a light emitter emitting light for a light spot and a controller which controls the light emitter, a coordinate detector which generates an electrical signal by detecting a light beam emitted from the light emitter, an optical system which focuses the light beam emitted from the light emitter on a sensor of the coordinate detector, a controller which controls the coordinate detector, and an arithmetic processor which calculates a three-dimensional position within work space or coordinates on a coordinate display screen from the electrical signal from the coordinate detector.

In the known devices, a photosensor assembly of the coordinate detector includes a line sensor as a first photosensor, and a single-pixel sensor as a second photosensor.

The line sensor as the first photosensor is complex in structure, and includes at least one sensor unit at one freedom of motion, for example, one sensor unit for coordinate detection in the X direction, one sensor unit for coordinate detection in the Y direction. The line sensor thus detects an incident angle of a light beam directed from the pointer in each of the freedoms of motion.

The second photosensor includes a single pixel, and obtains time axis information of the incident light beam from the pointer, namely, detects a variation in the strength of the light beam with time. To result in higher signal level, a plurality of photosensors may be used.

<Use of Ring CCD>

The main feature of the known devices is a ring CCD (Charge-Coupled Device) used as a line sensor (as will be detailed later).

The ring CCD has an electronic shutter function that is externally controlled. In the known devices, the light emitter emits an infrared light beam that blinks at a predetermined frequency, and the electronic shutter function is synchronized with the blinking of the infrared light beam to control (the effect of) external interfering lights. The ring CCD has a circulating charge transfer path. A charge generated in a photoelectric converter is directly to or via a line transfer path to the circulating charge transfer path. The ring CCD successively and additionally store charge each time the charge is circulated. Under external control, the ring CCD has a function of switching between a mode in which charge is circulated while additional charge is successively stored and a mode in which charge is circulated while no additional charge is successively stored. In the known devices, switching control is adaptively performed in response to the quantity of light directed from the pointer. A wide dynamic range in photosensing is achieved by storing a large number of times light when the light is at a high level, and by storing a small number of times light when the light is at a low level.

When a charge above a predetermined quantity of charge is stored at any cell in the circulating charge transfer path, a certain amount of charge is extracted from all cells along the circulating charge transfer path. This operation, called a skimming operation, prevents the transfer path from being saturated.

<Second Photosensor>

The other feature of the known devices is the second photosensor, which is a single-pixel photosensor. The ring CCD obtains position information of an infrared light beam directed from the pointer (specifically, information of the incident direction of the infrared light beam). In contrast, the second photosensor obtains time-series information in the infrared light beam emitted from the pointer. The time-series information contains time axis information serving as blinking timing and an accompanying signal superimposed on a blinking signal. The accompanying signal is input by a switch on the pointer.

In the known devices, the blinking signal is modulated with a predetermined frequency (for example, several 100 kHz) sufficiently higher than a blinking frequency, and a sharp resonance characteristic is imparted to the amplifier of the second photosensor at the same frequency as that of the modulation frequency. A signal with less noise due to external interfering lights is thus extracted.

The accompanying information input from the switch on the pointer is transmitted with the degree of modulation varied. The blinking timing from the time-series signal is obtained from the second photosensor, and the ring CCD is controlled in a predetermined timing sequence with the blinking timing used as a trigger. The electronic shutter of the ring CCD is thus synchronized with the blinking signal. The link between the pointer and the apparatus body is thus performed in a wireless fashion in the known devices.

Since the blinking timing and the timing of the electronic shutter are synchronized with each other, the blinking signal and the operation of the electronic shutter are identical in frequency and phase.

The exposure time of the line sensor per blinking cycle is always constant. Specifically, when the pointer blinks at a maximum number of times of n per coordinate sampling, the maximum exposure count is n, and the minimum exposure count is 1. In this case, the dynamic range is expressed as DRANG=n.

In view of the coordinate sampling rate and the blinking frequency in this embodiment, the exposure count n is 200 at a maximum, in other words, DRANGE is on the order of 200.

In the coordinate input device of the known devices, the dynamic range of an amount of light substantially exceeds this value, depending on the angle of alignment of, the position of, the distance of, and the manner of handling of the pointer. Particularly when the pointer is placed close to a photosensor section, the photosensor section may be saturated. In such a case, the system stops or the accuracy of detecting the coordinates substantially drops.

The present invention resolves this problem, and proposes a new method which is implemented with a minor change introduced into the system.

To expand dynamic range, the maximum sensitivity of the device is typically increased or the minimum sensitivity of the device is decreased. To lower the minimum sensitivity, the entire sensitivity of the device or light intensity of the emitter side needs to be raised.

The present invention expands dynamic range by lowering the minimum sensitivity.

It is contemplated that exposure time per blinking cycle is shortened by increasing the blinking frequency and the electronic shutter frequency.

For example, the blinking frequency may be increased by five times, thereby reducing the exposure time to one-fifth, and given the constant maximum sampling period, the minimum exposure time is reduced to one-fifth. As a result, DRANGE is quintupled.

The blinking frequency is carefully determined with the sensitivity characteristics and disturbance suppression effect of the CCD accounted for. In the determination of the blinking frequency, the improvement of the DRANGE is not a primary concern.

In accordance with the present invention, the phases of the blinking cycle and an electronic shutter are greatly shifted from each other at the beginning of one coordinate sampling (one coordinate detection period) to shorten the effective exposure time per lighting cycle at the beginning of the coordinate sampling. As the blinking cycle count increases, a phase shift is reduced. Slightly prior to the end of the coordinate sampling, the phase of the blinking cycle and the electronic shuttering coincide, resulting in a maximum amount of exposure per cycle.

In practice, a phase difference is provided between the blinking cycle and the electronic shuttering at the beginning of one coordinate sampling and a slight difference is introduced between the frequency of the blinking cycle and the frequency of the electronic shuttering so that the phases of the blinking cycle and the electronic shuttering coincide with each other slightly prior to the end of the one coordinate sampling. The above-discussed time relationship is thus achieved.

In this way, the maximum sensitivity remains unchanged, and the minimum sensitivity is lowered to a fraction of that achieved in the known devices. The present invention thus results in dynamic ranges several magnitudes wider than that achieved in the known devices.

The "coordinate input device" as the first embodiment will now be discussed in comparison with the above-referenced known devices.

Figure 2:
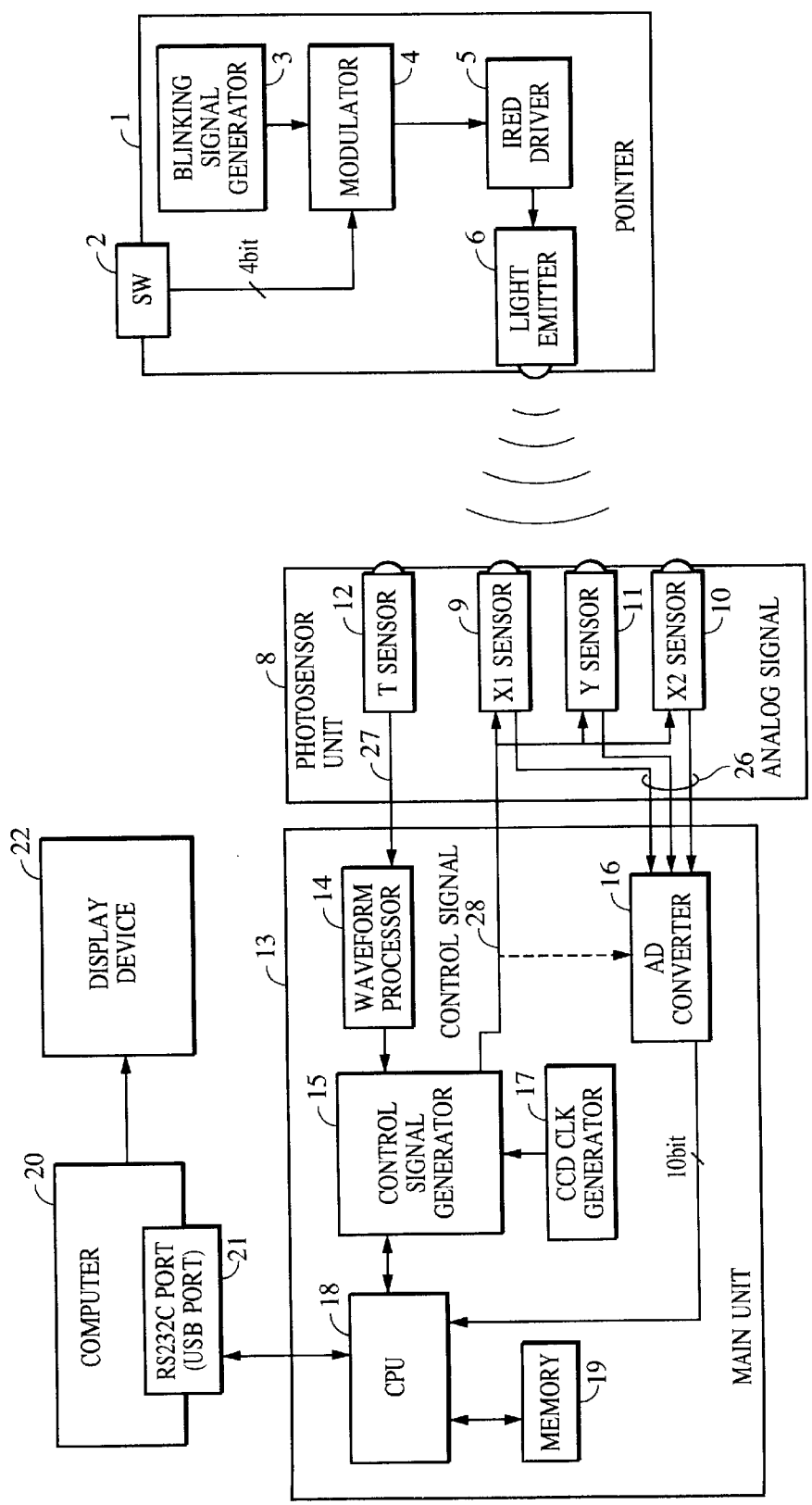
FIG. 2 is a block diagram showing the general construction of the coordinate input device of the first embodiment of the present invention.
Figure 22:
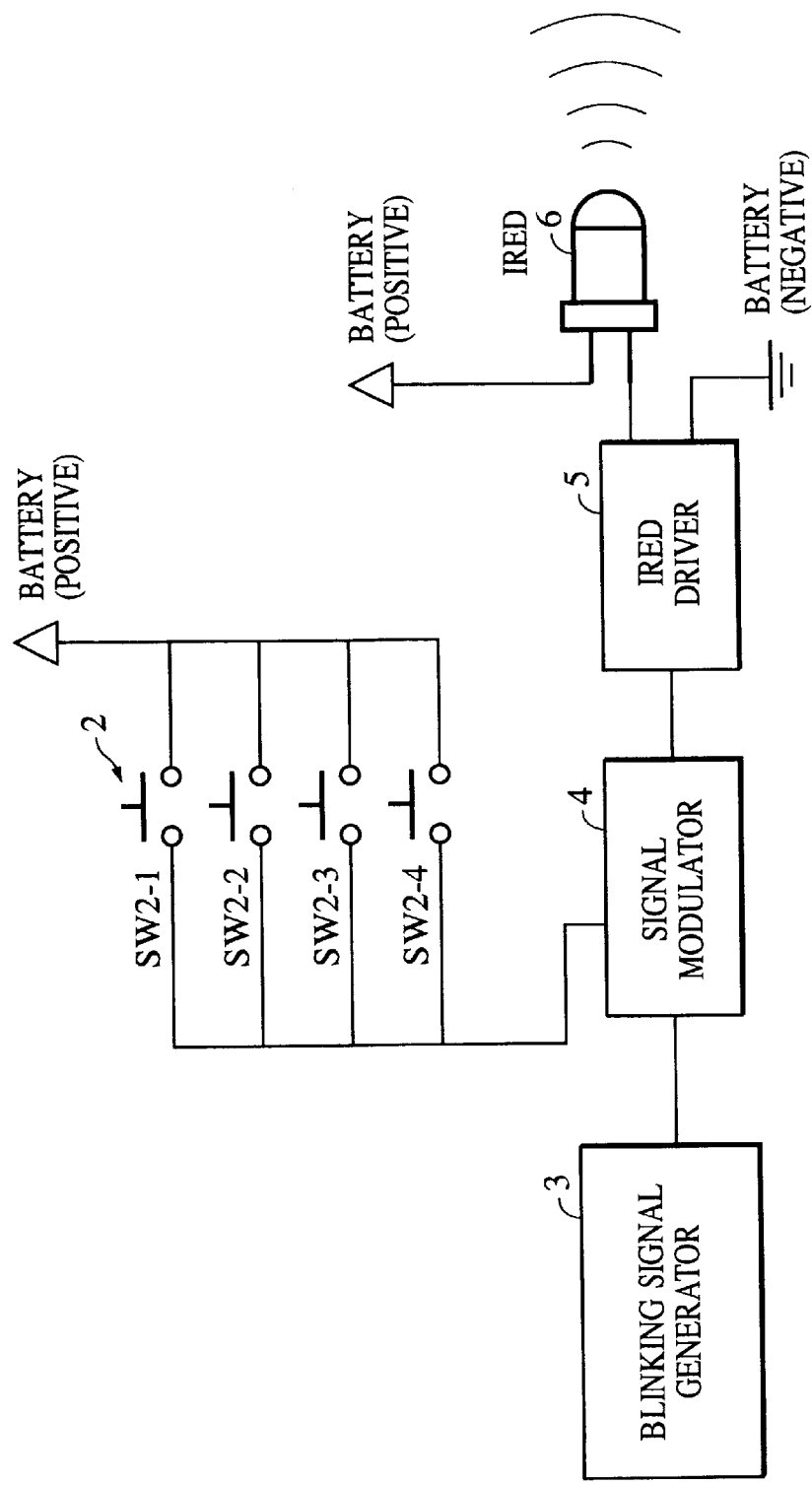
FIG. 22 illustrates the construction of the pointer in the first example of the first embodiment of the present invention.

FIG. 1 is a perspective view showing the coordinate input device. FIG. 2 is a block diagram generally showing the construction of the coordinate input device. FIG. 22 is a block diagram showing the construction of the pointer 1.

Referring to FIG. 1, FIG. 2, and FIG. 22, there are shown the pointer 1, a photoreceiving unit 8 for detecting light from the pointer 1, a main unit 13, and a display unit 22.

Figure 3:
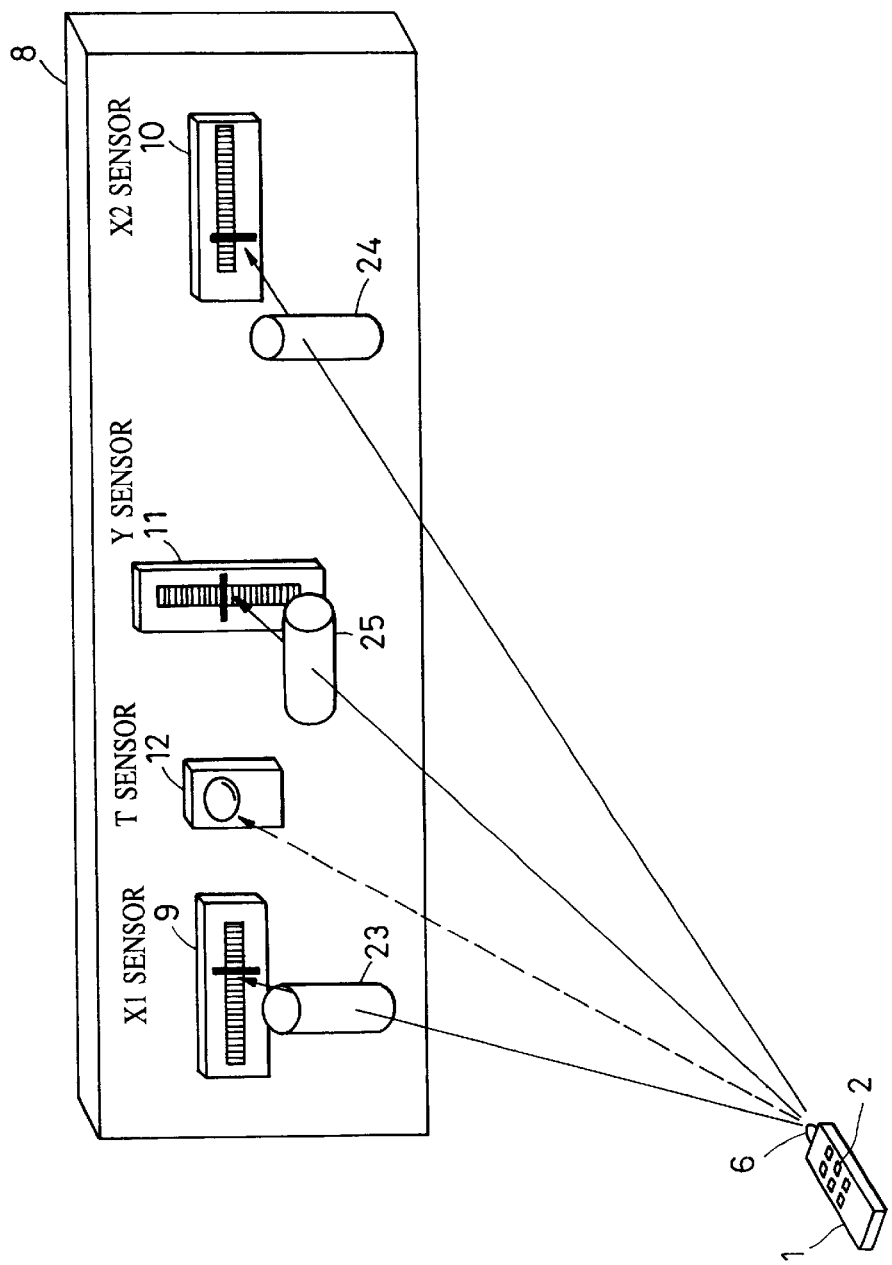
FIG. 3 shows the layout of a pointer, sensors, and lenses of the coordinate input device in accordance with the first embodiment of the present invention.

FIG. 3 illustrates the pointer 1, cylindrical lenses and sensors in the photosensor unit 8.

The first embodiment of the present invention includes the pointer 1 emitting an infrared light beam, the photosensor unit 8 which converts the infrared light beam received from the pointer 1 into an electrical signal or a data chain, the main unit 13 which controls the photosensor unit 8, calculates a three-dimensional position at which the pointer 1 is present, based on the electrical signal or the data chain generated by the photosensor unit 8, and sends the calculated result to a host computer 20, and a display device 22 for presenting an image from the host computer 20 thereon.

The construction of each block and the operation of the coordinate input device will now be discussed.

Referring to FIG. 2 and FIG. 22, the pointer 1 as a light emitter includes a light emitter element 6 which emits a light beam, a blinking signal generator 3 providing an emission pattern, a modulator 4 which perform modulation in accordance with SW (switch) information, and an IRED (infrared) driver 5. The SW information is input from a switch bank 2.

Referring to FIG. 2, and FIG. 3, the photosensor unit 8 includes line sensors X1, X2, and Y (respectively designated 9, 10, and 11 in FIG. 3), and cylindrical lenses (respectively designated 23, 24, and 25 in FIG. 3) respectively combined with the line sensors X1, X2, and Y for the focusing infrared light beam. The photosensor unit 8 further includes a single-pixel sensor T (designated 12 in FIG. 3).

The line sensors X1 and X2 detect the infrared light beam in the incident angle in the X direction and the line sensor Y detects the infrared light beam in the incident angle in the Y direction.

Figure 4:
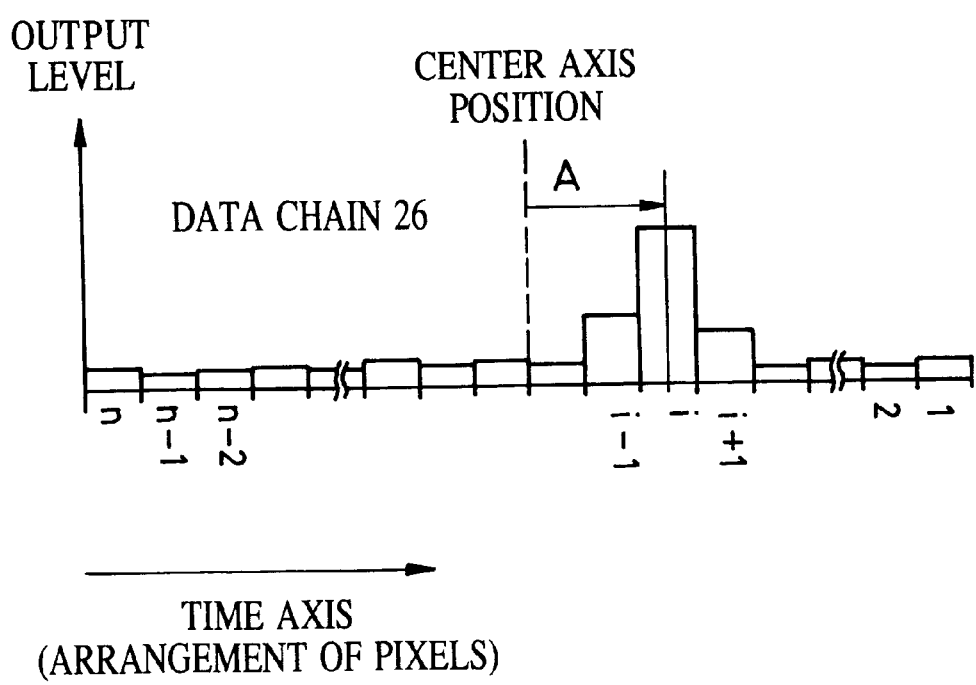
FIG. 4 shows a data chain of a ring CCD of the coordinate input device in the first embodiment of the present invention.

The line sensors X1, X2, and Y are so-called ring CCDS. A signal (a data chain) 26 coming from these ring CCDS is shown in FIG. 4. The center of the data chain (represented by Ai in FIG. 4) indicates a focused position in each line sensor, namely, an incident angle.

Each signal (the data chain) is converted into a digital signal through an AD (analog-to-digital) converter 16. A CPU (Central Processing Unit) 18 calculates a three-dimensional position of the pointer 1 (more precisely, the emitter section of the pointer 1) from the digital signal, and sends the result to the host computer 20. The line sensors X1, X2, and Y are controlled in accordance with a timing sequence generated by a control signal generator 15.

The T sensor 12, which is the second photosensor, is a single-pixel photoelectric converter element. The T sensor 12 obtains time axis information of the light beam emitted from the pointer 1.

The signal (modulated signal) obtained by the T sensor 12 is applied to a bandpass filter, and is full-wave rectified, smoothed, and then binarized in a waveform processor 14. A signal "IR" thus results, and is then sent to the control signal generator 15.

Figure 5:
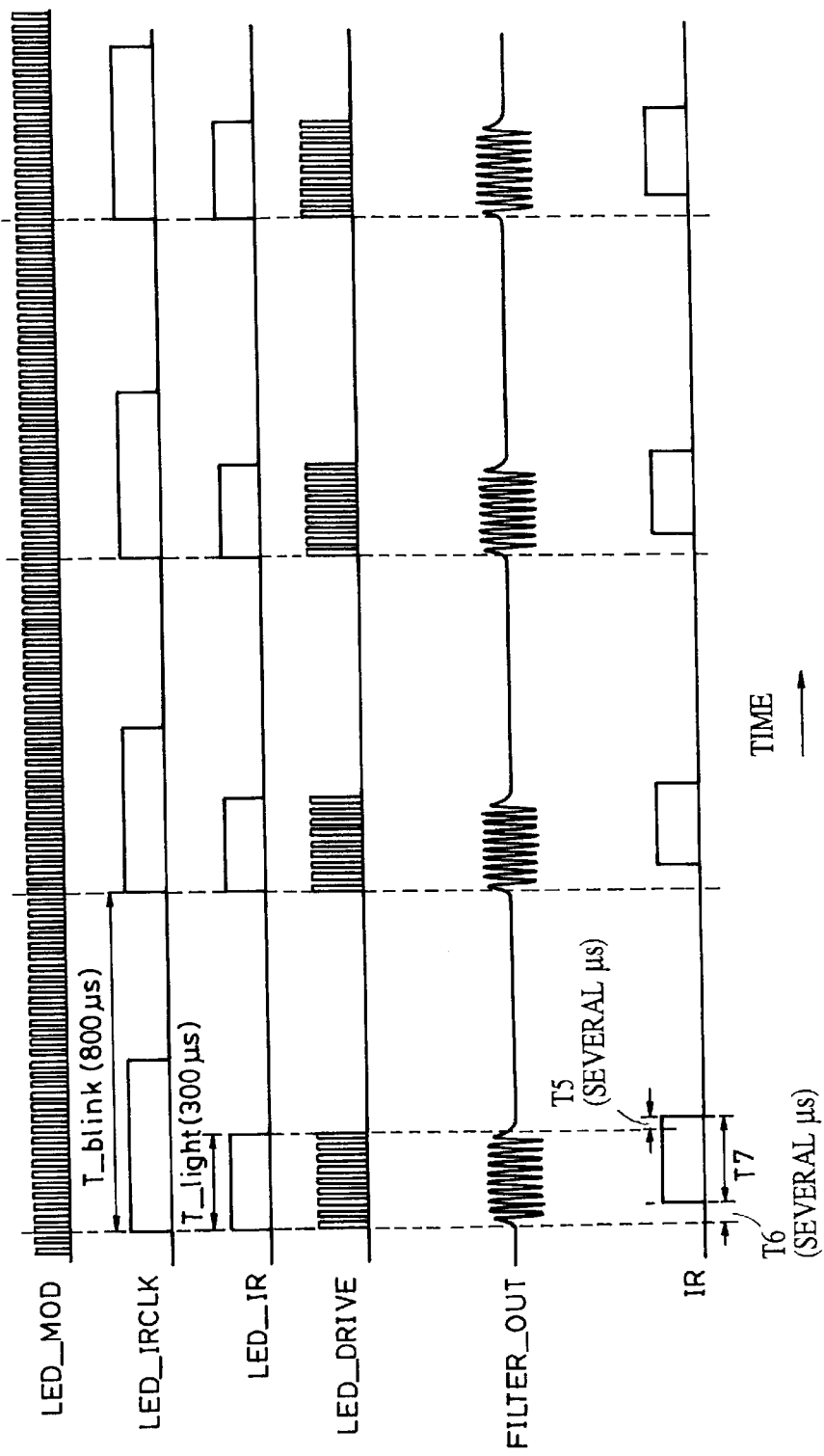
FIG. 5 is a timing diagram of the coordinate input device of the first embodiment of the present invention.
Figure 6:
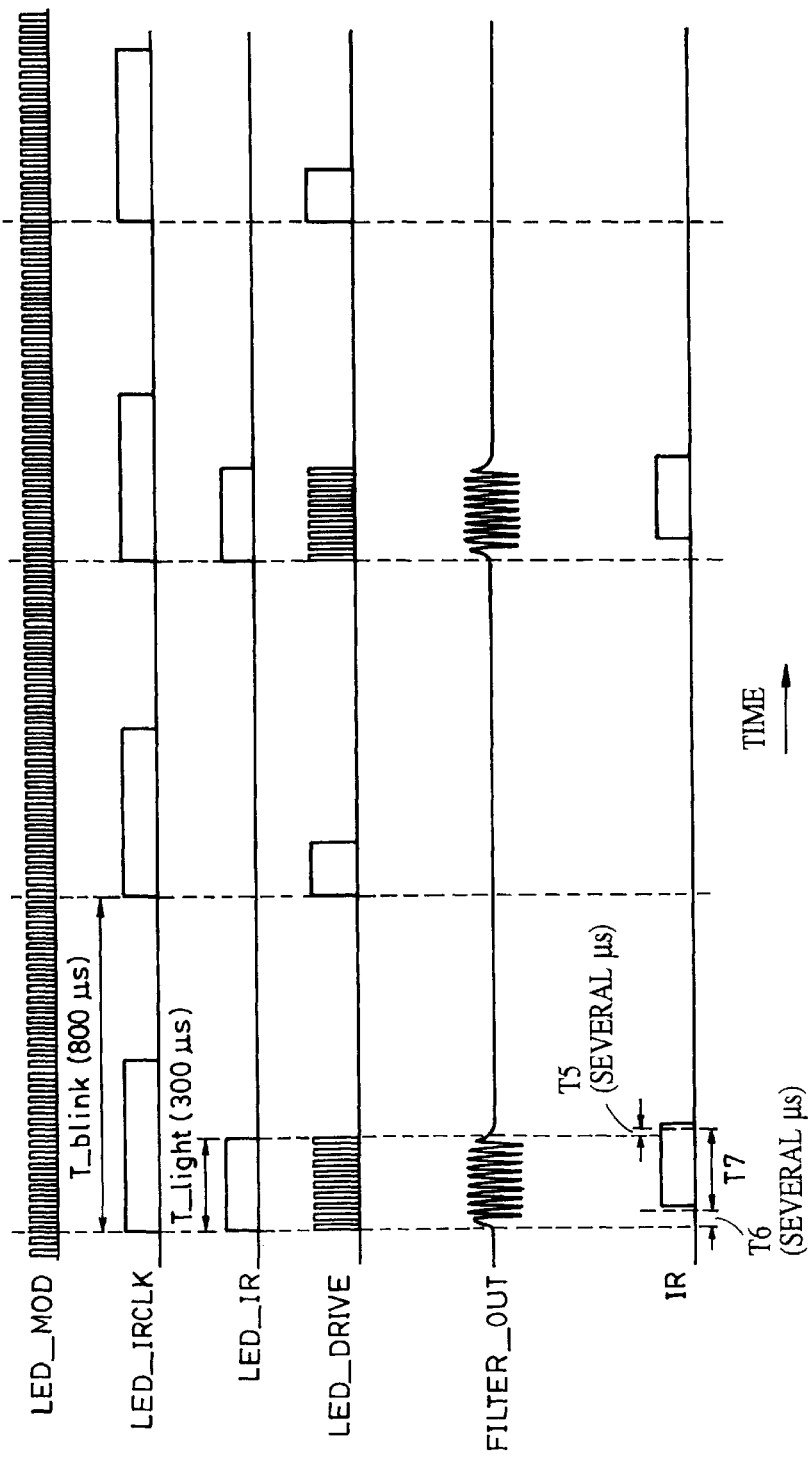
FIG. 6 is a timing diagram of the coordinate input device of the first embodiment of the present invention.

Referring to FIG. 5 and FIG. 6, the control signal generator 15 detects an accompanying signal (information from the switch bank on the pointer 1) by determining the signal "IR" under a predetermined condition, and also detects the falling edge or the rising edge of the signal "IR," and generates a reset signal "RESET" with resect to the falling edge or the rising edge of the signal "IR." The timing sequence is started in response to the falling edge or the rising edge as a trigger. The timing sequence is then sent as a control signal 28 to the line sensors 9, 10, and 11.

The timing sequence is repeated each time three-dimensional coordinates for one point are captured. The line sensors 9, 10, and 11 are controlled in accordance with the timing sequence.

The coordinate input device will now be discussed block by block.

<Calculation Means for Calculating Three Dimensional Coordinates>

The three-dimensional coordinate calculation means in the first embodiment will now be discussed.

Figure 7:
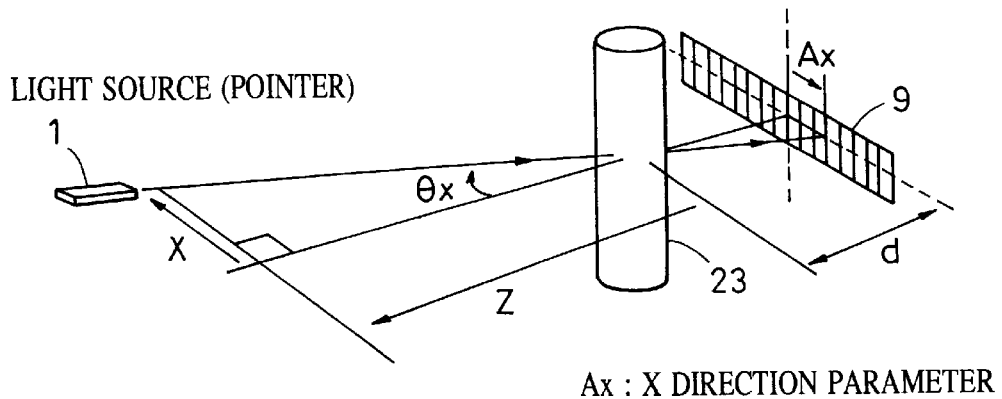
FIG. 7 illustrates the positional relationship between a line sensor and a light source in the coordinate input device of the first embodiment of the present invention.
Figure 8:
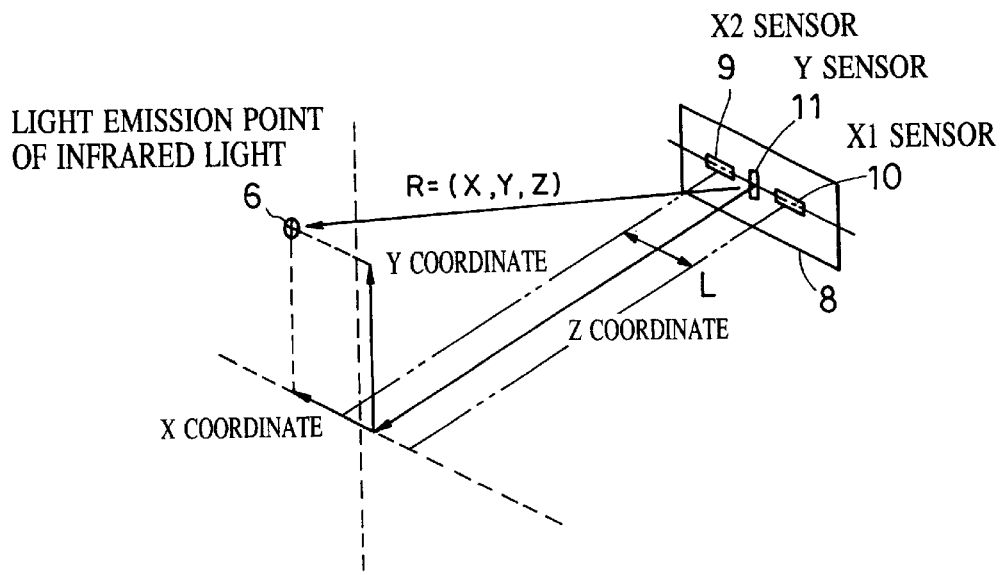
FIG. 8 is a diagram defining coordinates R(X,Y,Z) and distance L in the coordinate input device of the first embodiment of the present invention.

FIG. 3 shows the positional relationship of the line sensors, the cylindrical lenses, the emitter section of the pointer in the first embodiment. FIG. 7 shows the positional relationship of the X1 sensor 9, an incident direction θx of the infrared light beam, a direction parameter Ax, and a cylindrical lens 23. FIG. 8 defines the X axis, the Y axis, the Z axis, a position vector R(X, Y, Z), and a length L.

When a light source is deviated from the center line in a XZ plane by θx as shown in FIG. 7, the focused position of the light beam is shifted from the center of the line sensor 9 by Ax.

The following equation (1) holds:

$$Ax1 = dx \tan(\theta x1) \tag{1}$$

Ax1 is called a direction parameter (similarly, Ax2 is a direction parameter of X2, and Ay is a direction parameter of Y9).

In the layout of the first embodiment shown in FIG. 3, the relative position of the infrared emitter of the pointer 1 is determined with respect to the center of the sensor. In other words, a three-dimensional position vector R (i.e., X, Y, and Z components of the vector R) is determined.

A calculation procedure for calculating the vector R(X, Y, Z) will now be discussed. First, θx and Z are determined with reference to FIG. 7. In the first embodiment, there are two line sensors in the X direction in the same plane (the line sensor on the right-hand side is suffixed by number 1 and the line sensor on the left-hand side is suffixed by number 2). The X1 sensor and the X2 sensor are spaced by distance L. Each of the X1 and X2 sensors has the following relationships.

Namely, $$Ax1/d = \tan(\theta x1) \tag{2}$$

$$Ax2/d = \tan(\theta x1) \tag{3}$$

Also, the following equation (4) holds from FIG. 7.

$$\tan(\theta x) = \{\tan(\theta x1) + \tan(\theta x2)\}/2 \tag{4}$$

If the X direction parameter Ax is defined as follows:

$$Ax \equiv \{Ax1 + Ax2\}/2 \tag{5}$$

the following equation (6) holds.

$$\tan(\theta x) = Ax/d \tag{6}$$

If Ax1 and Ax2 are measured, θx is determined.

Now, Z is determined.

Figure 9:
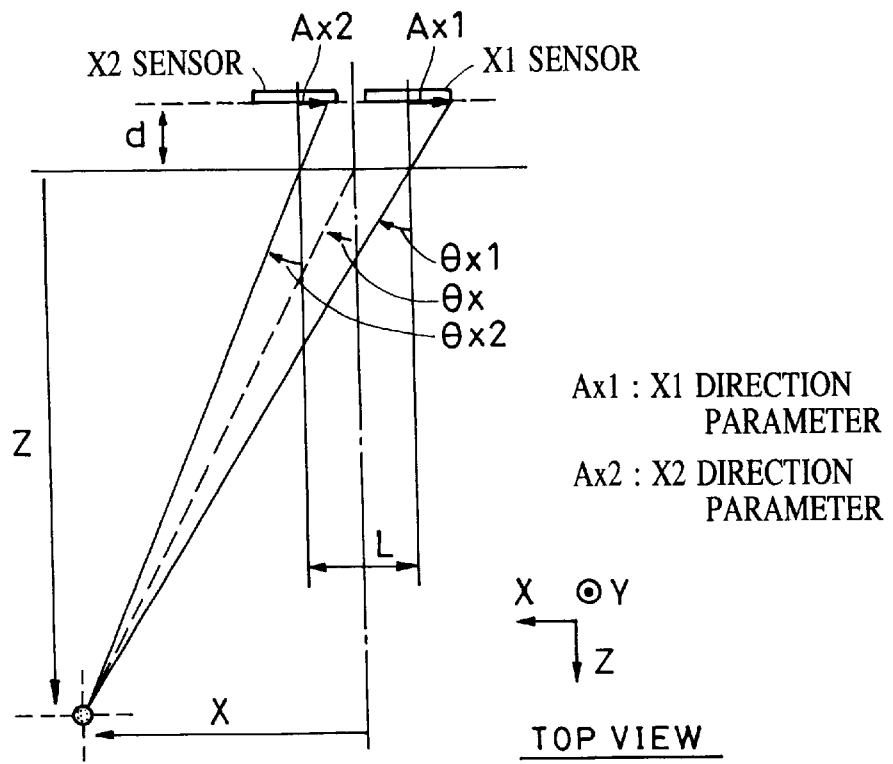
FIG. 9 is a diagram illustrating the relationship between an X component in an incident angle and an X direction parameter.

Referring to FIG. 9, the X1 sensor and X2 sensor are spaced by the distance L.

The following equations (7) and (8) hold.

$$\{X+(L/2)\}/Z=\tan(\theta x1)=Ax1/d \tag{7}$$

$$\{X+(L/2)\}/Z=\tan(\theta x2)=Ax2/d \tag{8}$$

From equations (7) and (8), the following equation (9) is obtained.

$$Z=(dL)/\{Ax1-Ax2\} \tag{9}$$

Namely, if Ax1 and Ax2 are measured, Z is determined.

Referring to FIG. 8, $\theta y$ will be determined. Like equations (2) and (3), equation (10) holds as follows:

$$\tan(\theta y)=Ay/d \tag{10}$$

If Ay is measured, $\theta y$ is determined.

From equations (6), (9), and (10), ($\theta x$, Z, $\theta y$) have been determined in that way.

Figure 10:
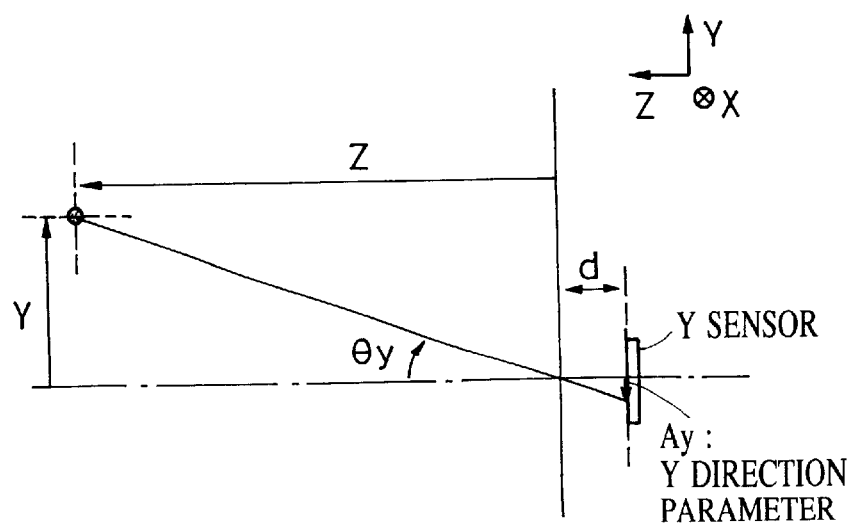
FIG. 10 is a diagram illustrating a Y component in an incident angle and a Y direction parameter.

As seen from FIG. 9, and FIG. 10, X, Y, and Z are related as follows:

$$X=Z\tan(\theta x) \tag{11}$$

$$Y=Z\tan(\theta y) \tag{12}$$

Equations (11) and (12) determine (X,Y).

The vector R(X, Y, Z) has been thus determined. The three-dimensional coordinate calculation method has been discussed.

<Emission of the Pointer (Emitter)>

The waveform "LED_DRIVE" of the light emitter element 6 is shown in FIG. 5 and FIG. 6. The modulator 4 in the pointer 1 generates a signal "LED_IRCLK" by frequency dividing a clock. The signal "LED_IRCLK" is a blinking timing signal for an LED on the pointer 1, and is 1.25 kHz (with a period of 800 $\mu$s).

A signal "LED_IR", having the same period as that of the signal "LED_IRCLK," has a predetermined duty factor (with a high level duration of 300 $\mu$s, for example). A signal "LED_DRVE" actually drives the light emitter element 6, and a modulating signal is obtained by gating a signal "LED_CLK" (at 500 kHz, for example) with the signal "LED_IR."

<Waveform Processor>

Figure 11:
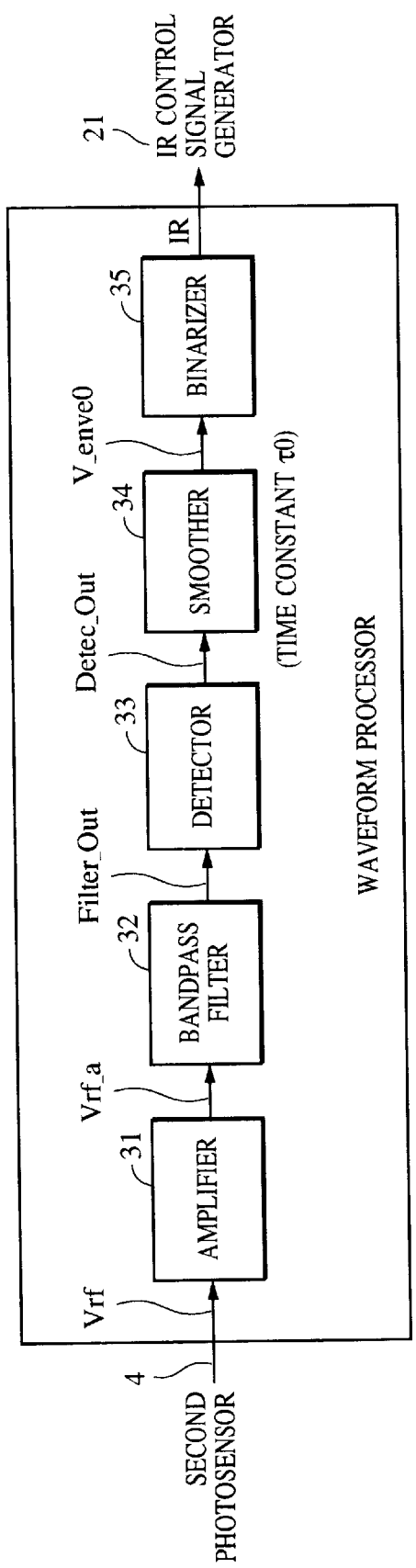
FIG. 11 shows a waveform processor.

The waveform processor 14 will now be discussed. FIG. 11 shows the construction of the waveform processor 14. The electrical signal, into which an optical signal is photoelectrically converted by the second photosensor element (the T sensor 12), is amplified to a predetermined level by an amplifier 31, and then passes through a bandpass filter 32 having a resonance frequency approximately equal to the frequency of the signal "LED_CLK" of the light emitter side (500 kHz, for example).

After passing through a detector 33, a smoother 34, and a binarizer 35, the signal becomes a signal "IR." The signal "IR" is then sent to the control signal generator 15.

An output signal "FILTER_OUT" of the bandpass filter 32 is shown in FIG. 5 and FIG. 6. The signal "FILTER_OUT" transmitted from the emitter side is reproduced as the signal "IR" in the receiver side. The signal "IR" is slightly delayed both at the rising edge and the falling edge thereof because of the phase characteristics of the bandpass filter 32 and the smoother 34 (the delay time in this embodiment is several $\mu$s). The signal "IR" has a slight delay from the signal "LED_IR."

<Information of the Switch Bank 2 on the Indicator>

Referring to FIG. 22, the pointer 1 includes the switch bank 2 in the first embodiment. The switch bank 2 is typically used to input data and commands, like a right button, and a left button on a mouse, or pen up/down switches on a digitizer, but the switch bank 2 may be used for other purposes.

In the first embodiment, a carrier having a frequency sufficiently higher than the blinking frequency is in part or whole modulated the blinking signal of the pointer 1 during the lighting time thereof.

In this arrangement, light receiving through the line sensors X1, X2, and Y becomes effective. The photosensor T effectively detects only a modulated portion of the received signal. The modulated portion only has significance as the time axis information.

When the switch bank 2 is not pressed in the first embodiment, the transmitted signal is modulated as shown in FIG. 5. When a particular switch of the switch bank 2 is pressed, modulation is activated every two cycles as shown in FIG. 6.

If viewed from the ring CCD, the emission pattern in any of the two cases appears to blink with the same period (T_blink). The signal "IR" at the second photosensor T, after being filtered, appears to blink with the same period T_blink when the particular switch in the switch bank 2 is not pressed, while appearing to blink with a period twice as long as T_blink when the particular switch in the switch bank 2 is pressed.

The coordinate detection by the ring CCD is performed in the same way regardless of whether the switch bank 2 is turned off or on, and one-bit information as the switch information is thus communicated as the accompanying information.

<Ring CCD for Incident Angle Detection>

The circulating charge CCD, namely, the ring CCD, in the first embodiment will now be discussed. The ring CCD is one type of line sensors. The ring CCD is largely different from the ordinary line sensor in that a path for transferring a charge obtained through photoelectric conversion is circular (or ring-shaped).

Figure 12:
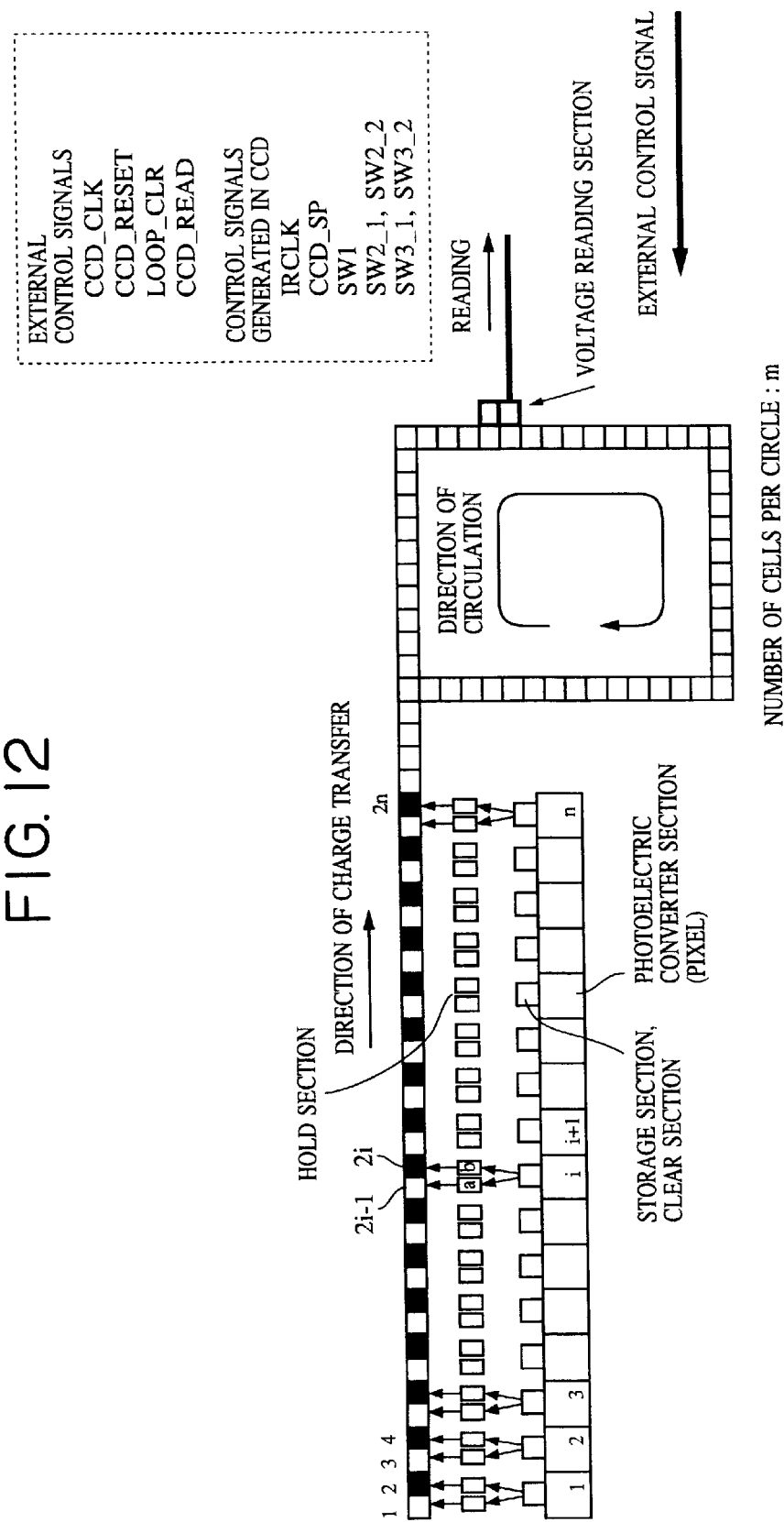
FIG. 12 is a diagram (1) illustrating the operation of the ring CCD.
Figure 13:
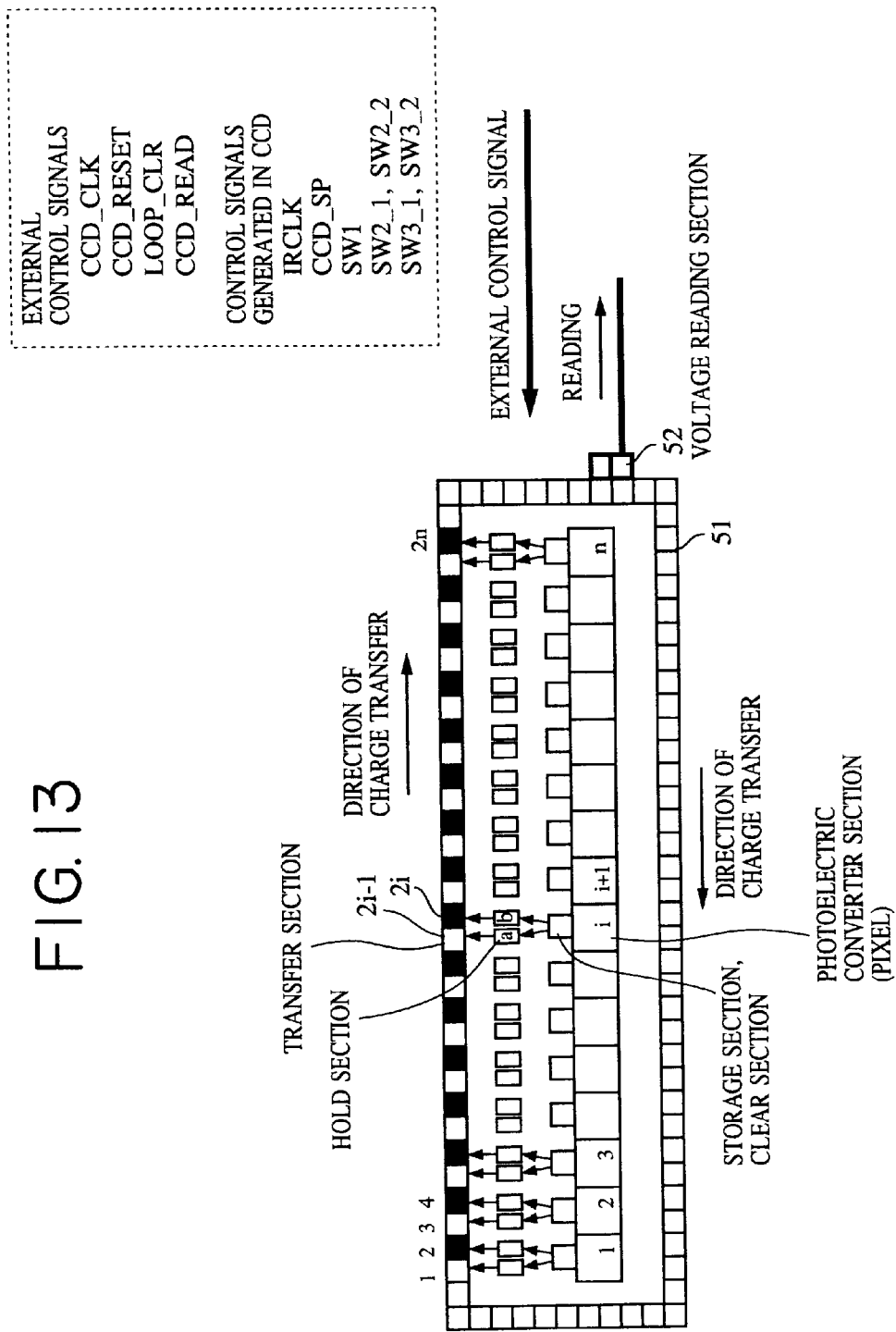
FIG. 13 is a diagram (2) illustrating the operation of the ring CCD.

The construction of the ring CCD is shown in FIG. 12 and FIG. 13. As disclosed in Laid-Open Japanese Patent No. 8-233571, the ring CCD includes a photoelectric converter section of n pixels (cells) arranged in a line, a circulating charge transfer path composed of m cells arranged in a ring, and a voltage reading section connected to a midpoint of the circulating charge transfer path.

Figure 14:
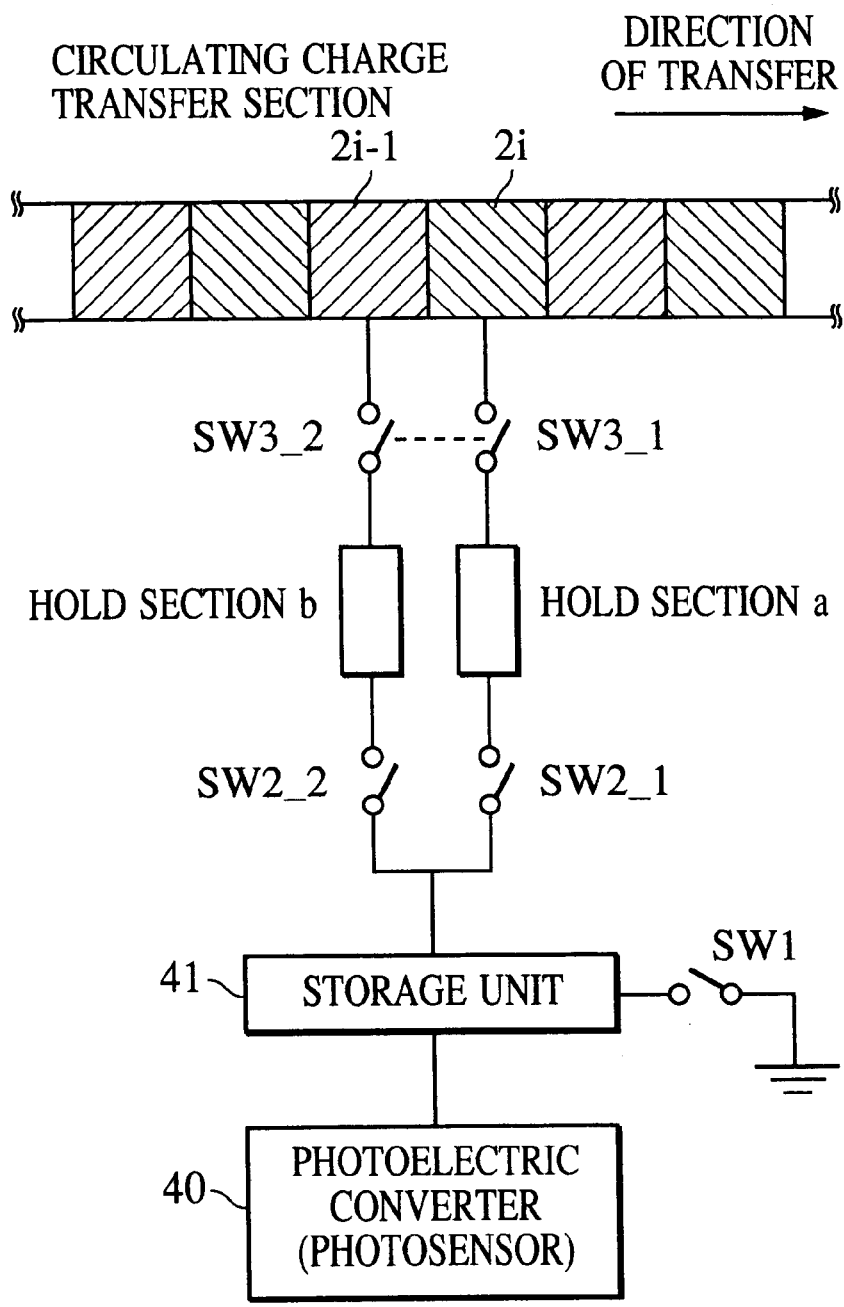
FIG. 14 is a diagram (3) illustrating the operation of the ring CCD.
Figure 15:
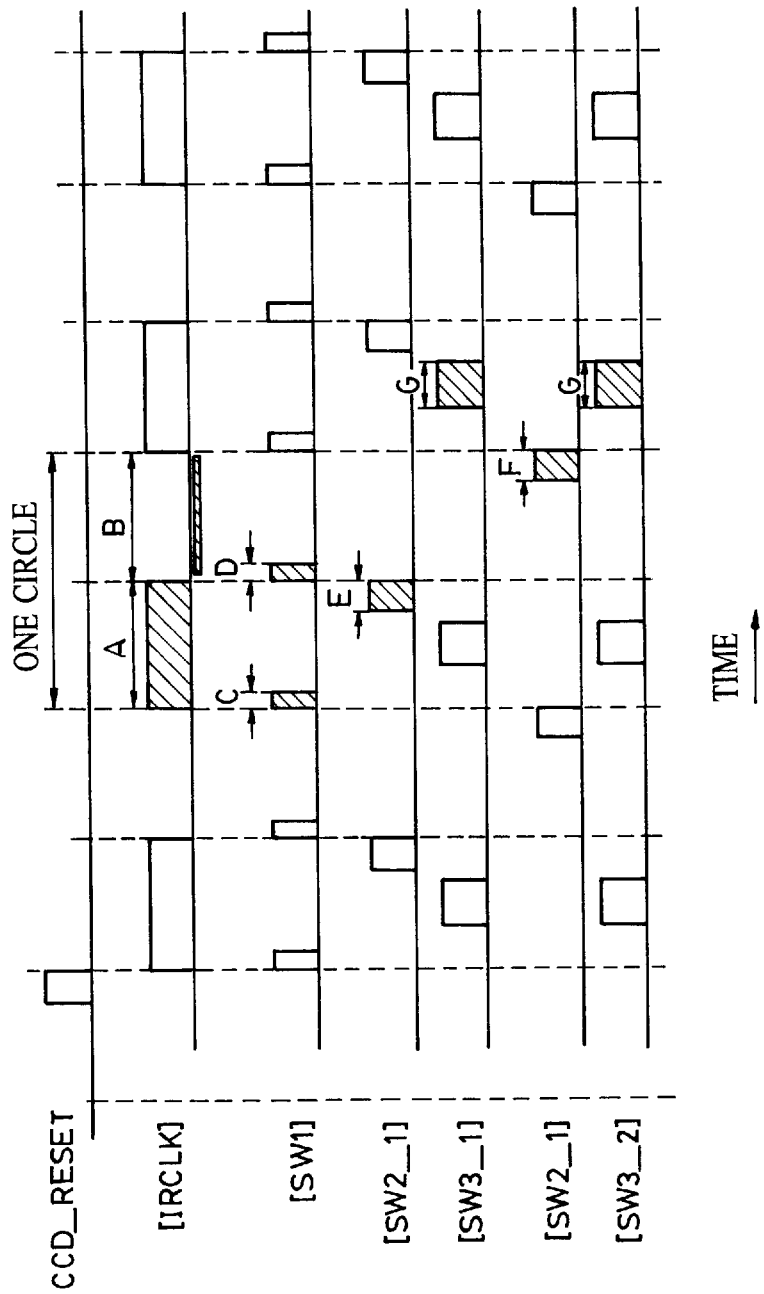
FIG. 15 is a diagram (4) illustrating the operation of the ring CCD.

Referring to FIG. 13, the ring CCD has 64 pixels (n=64) and 150 cells (m=150) in the first embodiment. The charge transfer on the ring CCD will now be discussed, with reference to FIG. 14 and FIG. 15. FIG. 14 shows part of the ring CCD, shown in FIG. 13, from an i-th photoelectric converter section to (2i−1)-th and 2i-th cells of the circulating charge transfer path. FIG. 15 shows the switching timing of switches shown in FIG. 14.

The charge, into which the photoelectric converter 40 photoelectrically converts the optical signal, is stored in the storage unit 41. The charge is then transferred to a hold section (a) or a hold section (b). The storage unit 41 discharges residual charges prior to the next storage. The charge, transferred to the hold section (a), is then transferred to a 2i-th cell of the circulating charge transfer path. Similarly, the charge, transferred to the hold section (b), is transferred to a (2i−1)-th cell in the circulating charge transfer path.

Figure 16:
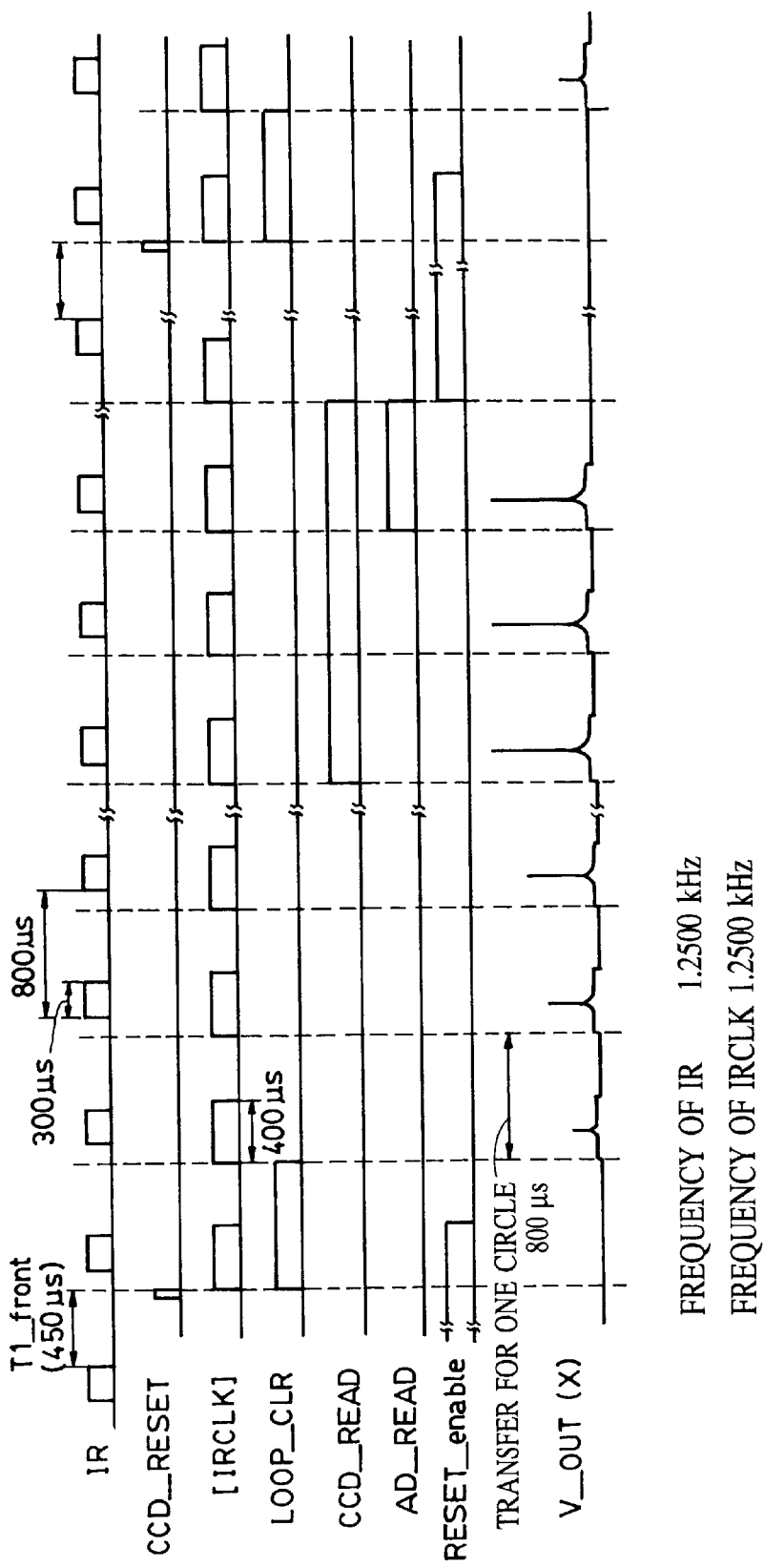
FIG. 16 shows a timing sequence in an alternate embodiment.

The operation of this portion is performed based on the signal "IRCLK" as a basic period. For convenience of explanation, the sequence of the known devices shown in FIG. 16 is first discussed, and sequences 1 and 2 in the first embodiment will then be discussed.

The signal "IRCLK" is 1.25 kHz, and has the same period as that of the signal "LED_IRCLK."

The signal "IRCLK" is obtained by frequency-dividing a charge transfer pulse by m (150, for example).

The function of the electronic shutter in the first embodiment is carried out by this portion. The signal "IRCLK" activates the electronic shutter twice a period.

For one time, the high portion of the signal "IRCLK" is intended to pick up light when the LED is lighting, and for the other time, the low portion of the signal "IRCLK" is intended to pick up light when no LED is lighting.

The ring CCD is now discussed step by step. Referring to FIG. 15, each hatched portion corresponds to a pair of electronic shutter operations (i.e., a set of electronic shutter activations, in other words, two operations).

The electronic shutter function will now be discussed. The charge at a storage unit 41 is cleared by a SW 1 at the timing of C. Throughout a duration A, a current generated at a photoelectric converter 40 is then stored in the storage unit 41. For a duration of time E, a SW 2_1 is turned on, transferring the charge from the storage unit 41 to a hold section (a). For a duration of time D, the charge in the storage unit 41 is cleared. During a duration of time B, a current generated in the photoelectric converter 40 is stored in the storage unit 41. The charge stored in the storage unit 41 is then transferred to a hold section (b) when a SW2_2 is turned on for a duration of time F.

The charges stored at the hold section (a) and (b) are respectively transferred to the 2$i$-th cell and the (2$i$–1)-th cell in the transfer path at the timing of G.

In the known devices, the signal "IRCLK" and the signal "LED_IRCLK" are synchronized with each other, and the LED on the pointer 1 emits light for a duration of time A, and emits no light for a duration of time B as shown in FIG. 15.

In this way, the charge during emission is stored in the hold section (a) and the charge during no emission is stored in the hold section (b). As a result, the charge during emission is transferred to the 2$i$-th cell in the transfer path, and the charge during no emission is transferred to the (2$i$–1)-th cell in the transfer path. The operations during the durations of time A, B, C, D, E, F, and G are concurrently performed on all pixels.

The operation of the circulating charge transfer path will now be discussed. Referring to FIG. 13, the circulating charge transfer path is cycled through with one period of the signal "IRCLK." The charges at the (2$i$–1)-th and 2$i$-th cells return to the same cells in every period of the signal "IRCLK," and charges stored in the hold sections (a) and (b) are then additionally stored there.

In this embodiment, the circulating charge transfer path is composed of 150 cells (m=150). The frequency of the transfer clock "CCD SP" of the circulating charge transfer path is 150 times the frequency of the signal "IRCLK."

The circulating charge transfer path 51 has, on the midpoint thereof, a signal reading section 52. The signal reading section 52 can read a voltage, by converting the charge passing along the circulating charge transfer path 51 into a voltage value in a non-destructive fashion. The signal reading section 52 can also read a voltage difference between two adjacent cells. For example, the signal reading section 52 can read a charge difference between the (2$i$–1)-th cell and the 2$i$-th cell to which the charges are transferred from the hold sections.

This function of the known devices allows the voltage signal corresponding to a charge difference between the charge stored during which the pointer 1 emits and the charge stored during which the pointer 1 does not emit. In this way, the effect of external interfering light having frequency component sufficiently lower than the blinking frequency is excluded.

The signal read through the signal reading section 52 is actually read in the same order as that arranged in the circulating charge transfer path. FIG. 4 shows this sequence. Voltages are read starting with an n-th pixel and ending with a first pixel. The voltage level is high in the vicinity of an i-th pixel shows that a directed light beam is focused on the sensor pixel array in the vicinity of the i-th pixel. By calculating the value of Ai in each of the X1 sensor, the X2 sensor, and the Y sensor shown in FIG. 4, parameters on which the incident angle of the infrared light beam to the X1, X2, and Y sensors is based is determined.

<External Control of the Ring CCD>

The control of the ring CCD will now be discussed. In the first embodiment, the ring CCD is repeatedly controlled each time coordinate data for one point is captured in accordance with the timing sequence generated by the control signal generator 15.

Figure 17:
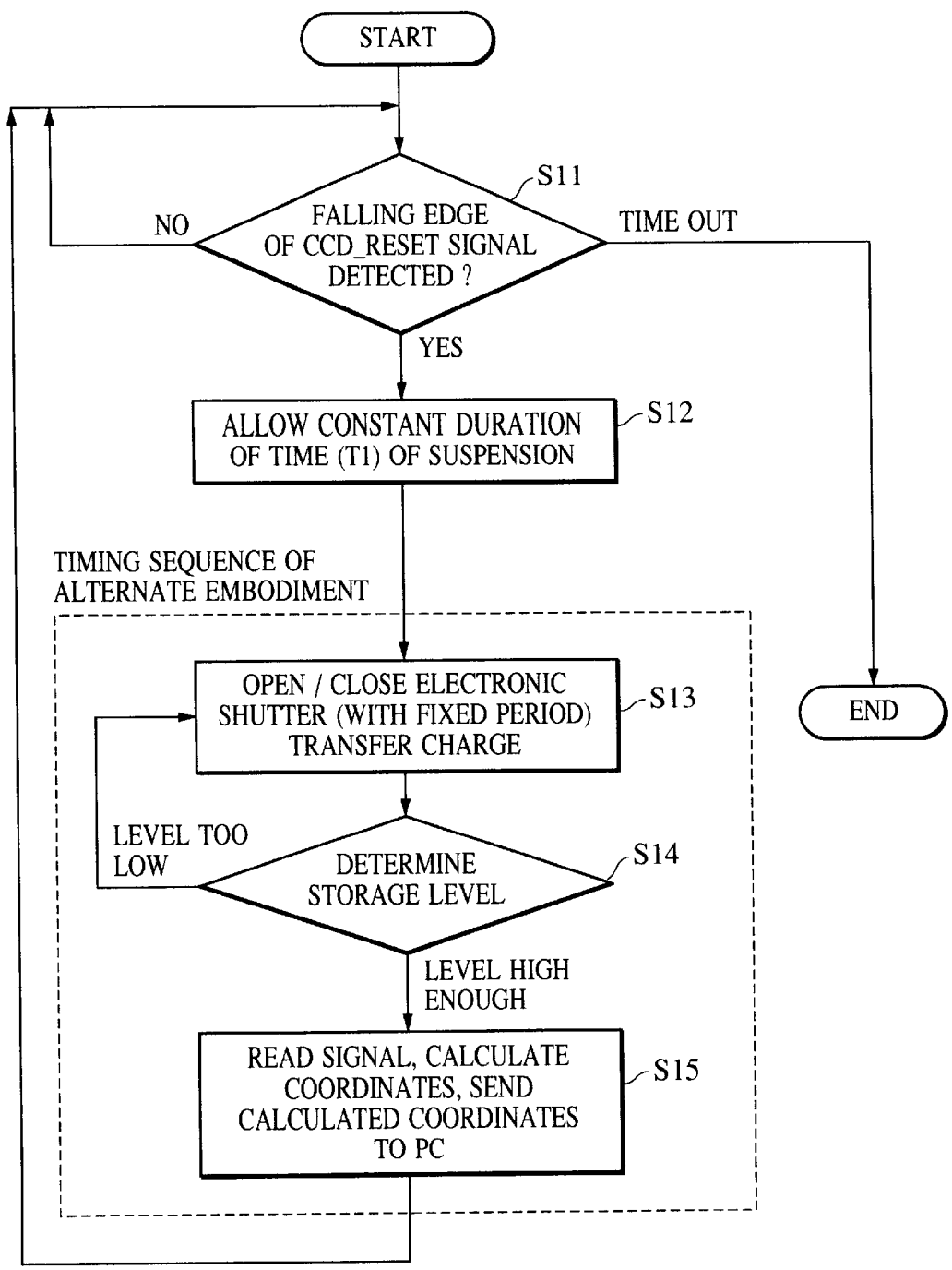
FIG. 17 is a flow diagram showing the operation of an alternate embodiment.

Referring to FIG. 16 and FIG. 17, the timing sequence of the known devices will now be discussed. Signal designates in brackets refer to signals that are generated within the ring CCD. The remaining signals are those supplied to the ring CCD from outside.

Upon receiving a signal "CCD_RESET" as a trigger, the ring CCD generates signals "CCD_SP" and "IRCLK." The signal "CCD_SP" is a transfer clock for the circulating charge transfer path. The signal "IRCLK" serves as a reference for a single electronic shutter operation as already discussed. The signal "IRCLK" also serves as a reference for the operation of transferring the charge from the photoelectric converter to the circulating charge transfer path.

The timing sequence in FIG. 16 will now be discussed step by step. A signal "LOOP_CLR" is fed from outside in synchronization with the signal "IRCLK." The signal "LOOP_CLR" clears charges residing in the circulating charge transfer path. For each cycling in synchronization with the signal "IRCLK," charges are additionally stored. Read waveform of V_OUT(X) becomes larger as shown in FIG. 16.

The control signal generator 15 constantly monitors the level of the read waveform, and when the level rises above a certain level (as described in step S14 in FIG. 17), a signal "CCD_READ" is driven high. The ring CCD stores charge throughout which the signal "CCD_READ" remains low. When the signal "CCD_READ" is driven high, storage stops, and only a circulating operation is continued.

While only the circulating operation is performed, the signal V_OUT(X) remains unchanged in waveform. When a predetermined time has elapsed, a signal "AD_READ" is driven high. In response, the signal V_OUT(X) is read in to the CPU 18 through the AD converter 16, and coordinate calculation is performed (step S15).

As already discussed, the signal "CCD_READ" is transitioned from low to high when the signal "V_OUT(X)" becomes constant, and additional storage of charge stops. When the signal level is high (when the level of the light beam is high), the time before the signal "CCD_READ" is transitioned from low to high is short and additional storage of charge is performed for a short period of time. When the signal level is low (when the level of the light beam is low), the above timing is slow, and additional storage of charge is performed for a long period of time. With this mechanism, the level of the waveform of the signal actually captured is relatively constant.

This means that the known devices work on a "light beam within a wide level range."

Herein, this mechanism is referred to as "an expansion of dynamic range through storage count control."

The present invention reinforces the function of the known devices for "the expansion of dynamic range through storage count control."

<Synchronization of Blinking and Electronic Shuttering>

Synchronization between the blinking of the emitter section of the pointer 1 and the electronic shuttering will now be discussed.

In the known devices, the frequency of emission of the pointer 1 ("LED_DRIVE") is set to be the same as that of the repetition frequency of the electronic shutter of the ring CCD on the receiver side (with the electronic shutter turned on twice in the period thereof). The frequency of the emission of the pointer 1 is 1.25 kHz, for example.

Referring to FIG. 16, the timing sequence of the ring CCD is set up starting with the signal "CCD_RESET." The signal "IRCLK" generated in the ring CCD starts at the falling edge of the signal "CCD_RESET." By controlling the timing of the "CCD_RESET," the timing (phase) of the signal "IRCLK" is controlled.

Specifically, the signal "CCD_RESET" falls after a delay time of T1 (450 $\mu$s, for example) from the signal "IR" from the waveform processor 14, which has been detected by the second photosensor 12 of the pointer 1 and obtained through the waveform processor 14. Immediately subsequent to the signal "CCD_RESET," the signal "IRCLK" is aligned with either the signal "LED_IR" or the signal "IR" in phase. This means that the blinking of the pointer 1 is aligned with the electronic shuttering in phase.

A flow diagram shown in FIG. 17 illustrates the relationship between the phase matching using the signal "CCD_RESET" and the timing sequence. To assure synchronization as illustrated in steps S11 and S12 shown in FIG. 17, the signal "IRCLK" is aligned with the signal "LED_IR" in phase by allowing the time T1 immediately prior to the timing sequence, and the signal "IRCLK" and the signal "LED_IR" are left in a free-running state thereafter for a succeeding one point (i.e., for one cycle of the timing sequence). When the timing sequence ends, a state to wait for the detection of the falling edge of the signal "CCD_RESET" is entered. When the next falling edge is detected, phase matching is performed by adjusting time again (i.e., on standby for the predetermined time T1), and then the next timing sequence starts over.

Of major concern are a free-running period and frequency deviations of the signal "IRCLK" and the signal "LED_CLK." In the known devices, a period for capturing coordinates for one point is set to a maximum of 40 ms. This means that the period of the signal "CCD_RESET" is 40 ms at maximum in FIG. 16, and that the maximum period for the free-running operation is 40 ms.

The known devices assume that each of an "LED_IR" generator and an "IRCLK" generator employs a crystal oscillator. Most of crystal oscillators have frequency stability better than 100 ppm.

When the frequency accuracy of the crystal oscillator is 100 ppm, the phase deviation that can occur during the free-running period is 4 $\mu$s (=40 ms×100 ppm), which is sufficiently short in comparison with the period of the signal "IRCLK" (800 $\mu$s, for example) and the lighting time 300 $\mu$s.

The signal "IRCLK" and the signal "LED_IR" are largely synchronized for the free-running period. The blinking of the emitter on the pointer 1 is thus synchronized with the electronic shutter of the ring CCD. This means that a wireless operation is established.

The timing sequence of the known devices has been discussed.

<First Example of the First Embodiment for further Expanding Dynamic Range>

As already discussed, the present invention is directed to a method for expanding dynamic range to the strength of incident light. A first example of the first embodiment of the method for expanding dynamic range will now be discussed.

Figure 18:
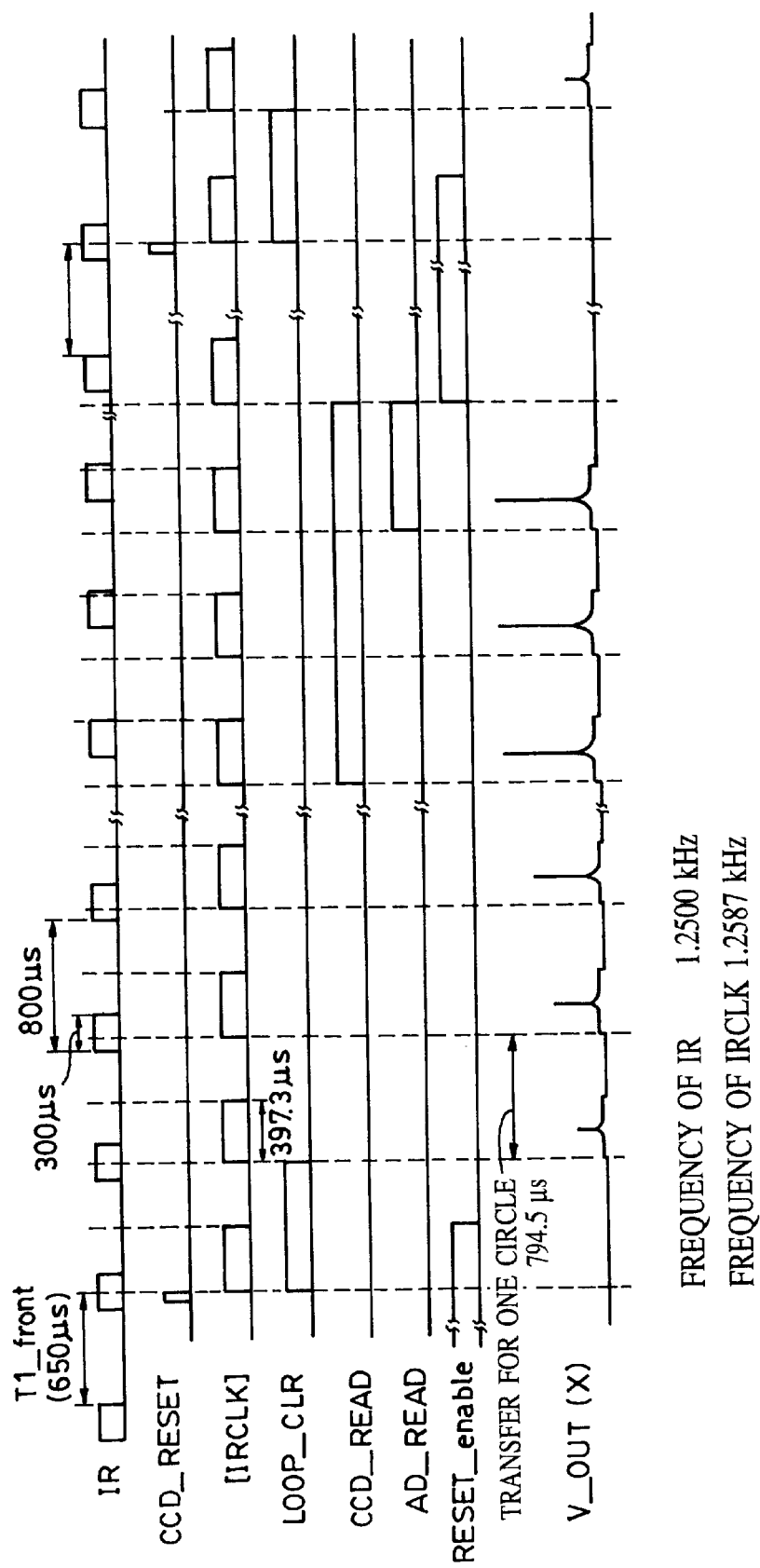
FIG. 18 shows a timing sequence 1 (of shutter timing targeting type) in a first example of the first embodiment of the present invention.
Figure 19:
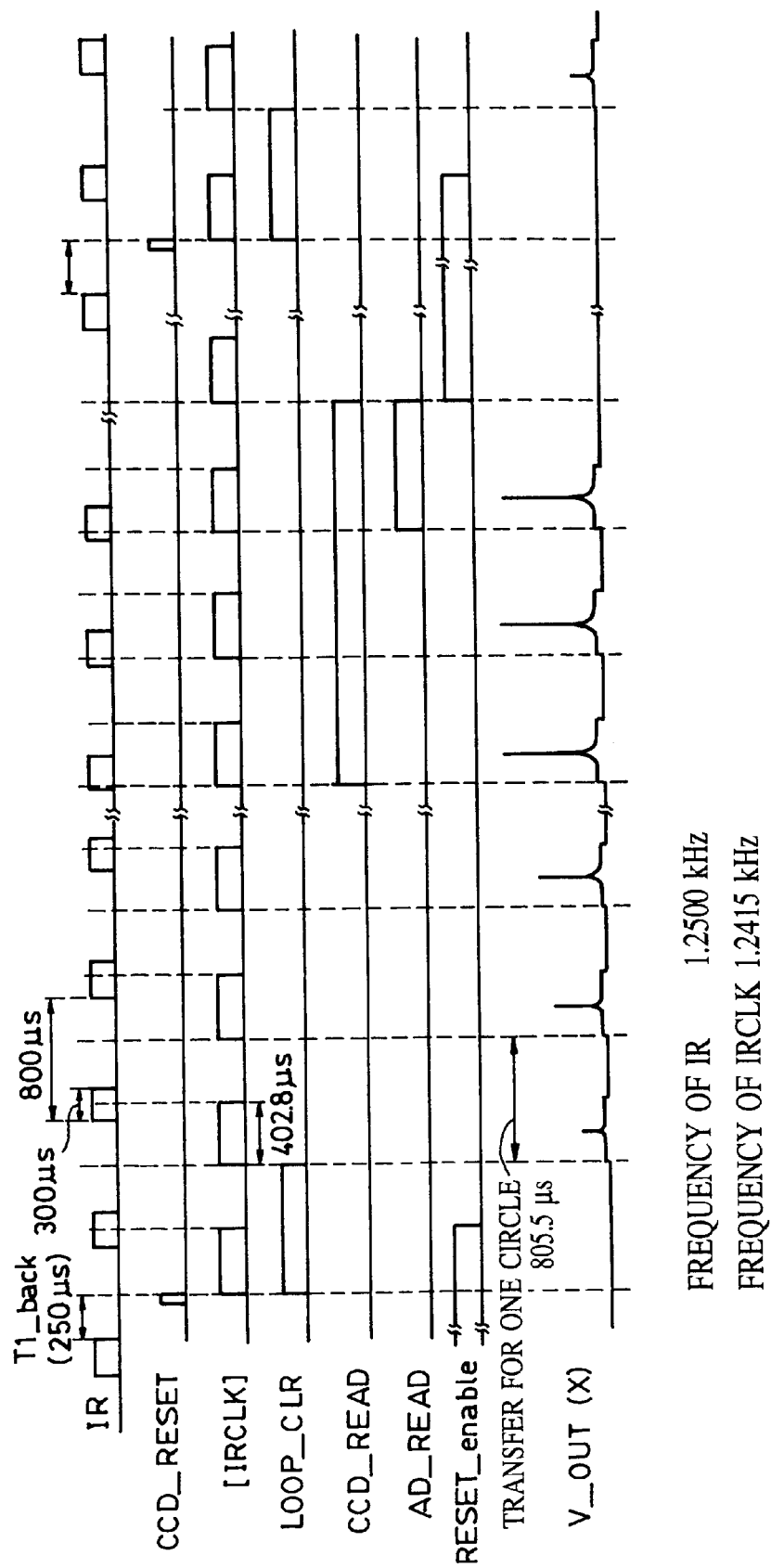
FIG. 19 shows a timing sequence 2 (of light timing targeting type) in the first example of the first embodiment of the present invention.

A timing sequence in the first example is shown in FIG. 18 and FIG. 19.

In the first example of the first embodiment, the external control of the ring CCD and the synchronization between the ring CCD and the LED blinking remain largely the same as those in the known devices. The difference is that a storage quantity per blinking cycle is reduced by deviating the signal "IRCLK" of the electronic shutter from the signal "LED_IR" (or "IR") in phase by a predetermined amount at the beginning of one coordinate sampling, and that the signal "IRCLK" and the signal "LED IR" (or "IR") are aligned in phase immediately prior to the end of the one coordinate sampling by slightly deviating the signal "IRCLK" from the signal "LED_IR" (or "IR") in frequency.

Specifically, the timing sequence is set to shift the high state of the electronic shutter forward to the beginning of the lighting time or backward to the end of the lighting time so that a difference, which is obtained by subtracting an overlapping duration of time of a first lighting time of the light emitter element 6 and a low state of the electronic shutter from an overlapping duration of time of the first lighting time of the light emitter element 6 and a high state of the electronic shutter, is equal to or less than one-tenth the lighting time. Furthermore, in the timing sequence, the frequency of the electronic shutter is set so that the center of the lighting time of the light emitter element 6 coincides with the center of the high state of the electronic shutter period at a blinking cycle count that falls within a range not more than the maximum number of blinking counts in each coordinate sampling and not less than half the maximum number of blinking counts.

By substantially lowering the minimum sensitivity, the "expansion of dynamic range through storage count control" is promoted even more.

Figure 20:
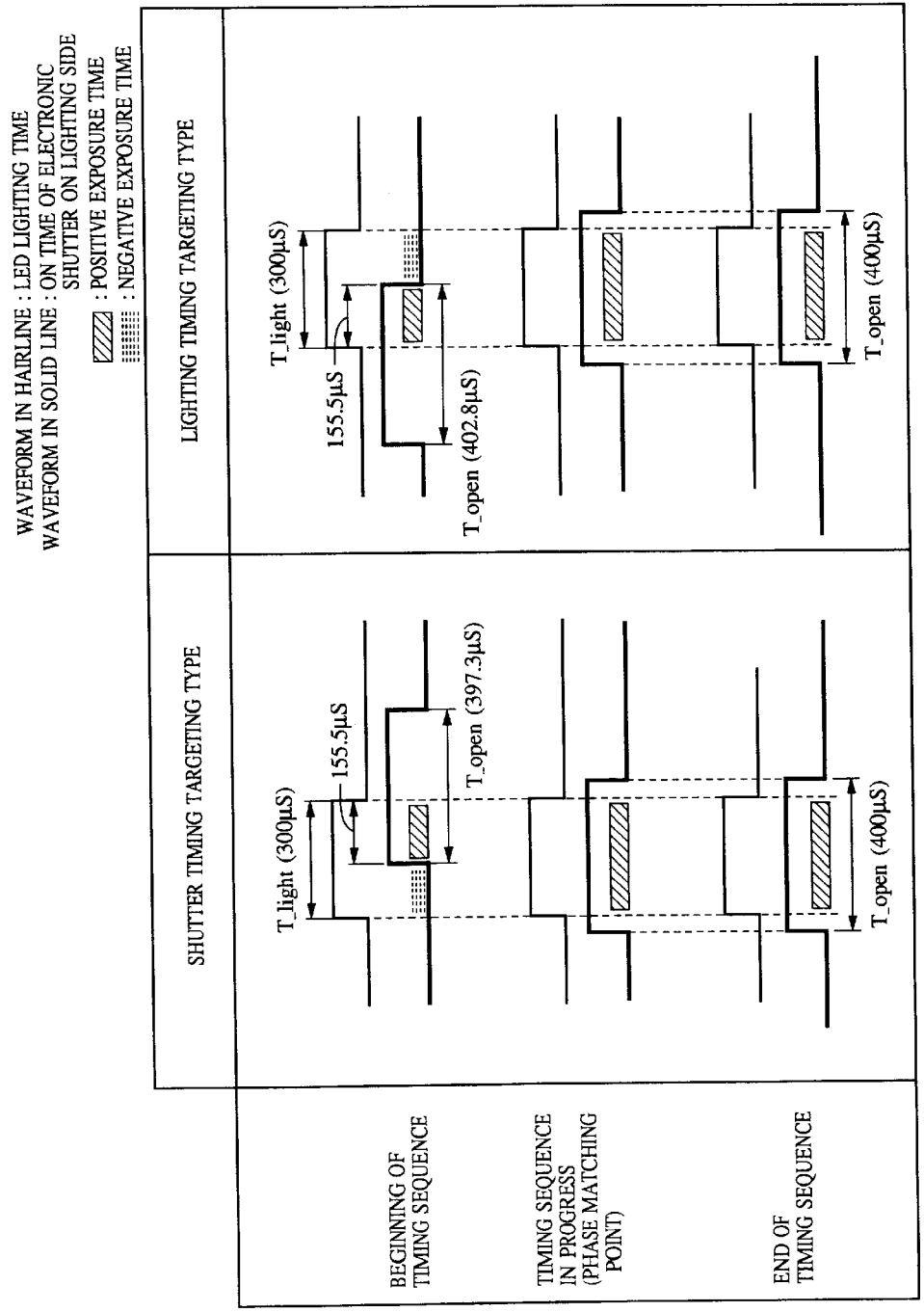
FIG. 20 shows the relationship between the light timing and electronic shutter timing in the first embodiment of the present invention.

FIG. 20 shows the shutter timing on which improved methods are based. There are two types of improved methods available: a shutter timing targeting method and a lighting timing targeting method.

In the shutter timing targeting method, the phase of the electronic shutter is shifted backward at the beginning of the one coordinate sampling to slightly shorten the period of the electronic shutter. In the lighting timing targeting, the phase of the electronic shutter is shifted forward at the beginning of the one coordinate sampling to slightly lengthen the period of the electronic shutter.

In this specification, a "positive exposure time" is defined as a high-level portion of the signal "IRCLK" with the LED lighting, a "negative exposure time" is defined as a low-level portion of the signal "IRCLK" with the LED lighting. As for a differential output of the ring CCD, a "differential equivalent exposure time" is defined as follows: the "differential equivalent exposure time"="positive exposure time"–"negative exposure time."

In this embodiment, the timing of the blinking and the electronic shutter is set up as below (see FIG. 18 and FIG. 19).

1) Blinking of the LED
   Frequency of the LED: 1.2500 kHz (period 800 μm)
   Lighting pulse width of the LED: 300 μs
2) Electronic Shutter
   a) Shutter timing targeting method
      Frequency of electronic shutter IRCLK: 1.2587 kHz (period 794.5 μs)
      High-level time of IRCLK: 397.3 μs T1_front=650 μs
      Initial "positive exposure time": 155.5 μs (shifted forward to shutter timing)
   b) Lighting timing targeting method
      Frequency of electronic shutter IRCLK: 1.2415 kHz (period 805.5 μs)
      High-level time of IRCLK: 402.8 μs T1_back=250 μs
      Initial "positive exposure time": 155.5 μs (shifted forward to shutter timing)

Figure 23:
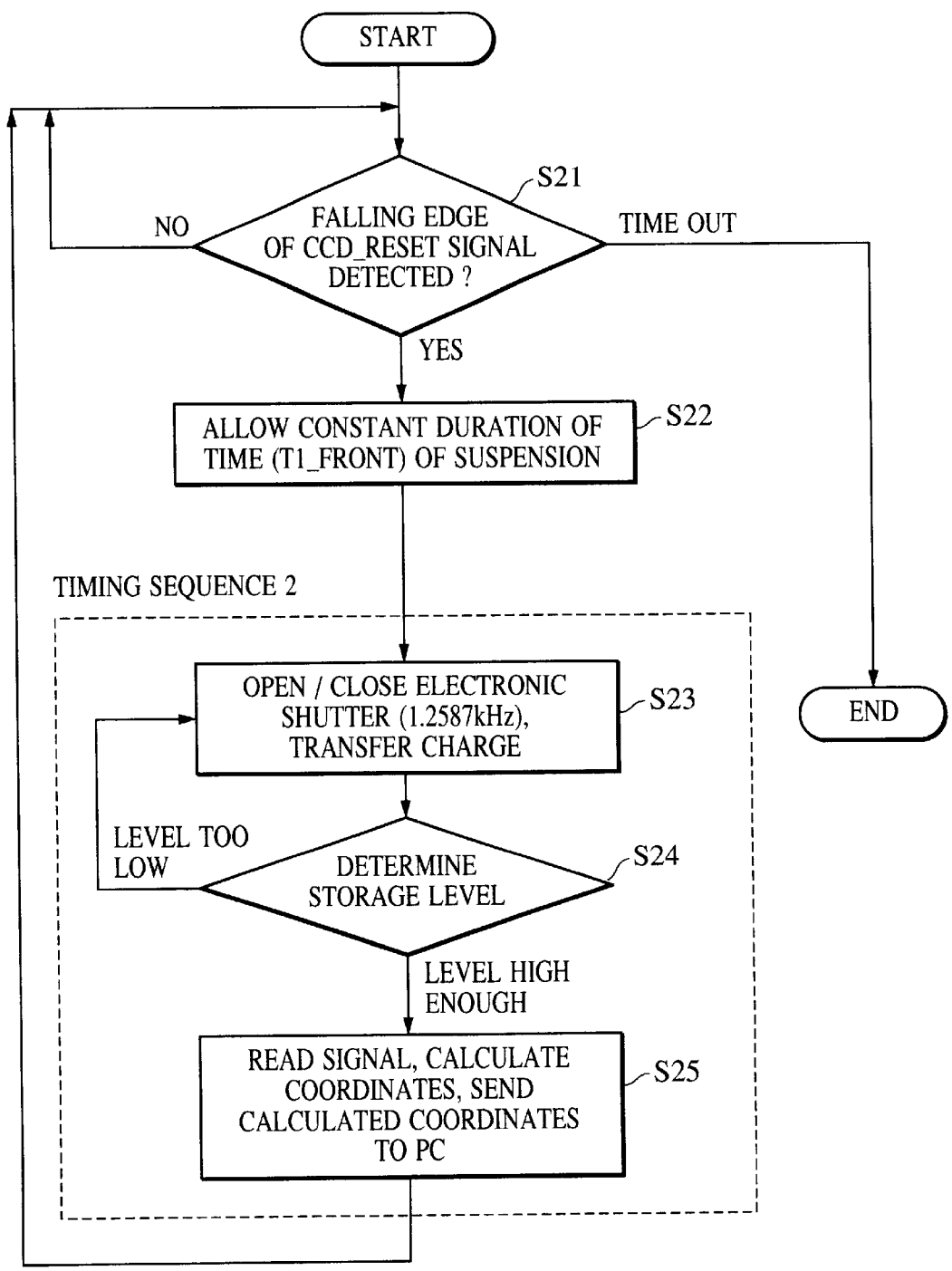
FIG. 23 is a flow diagram showing the timing sequence 1 in the first example of the first embodiment of the present invention.
Figure 24:
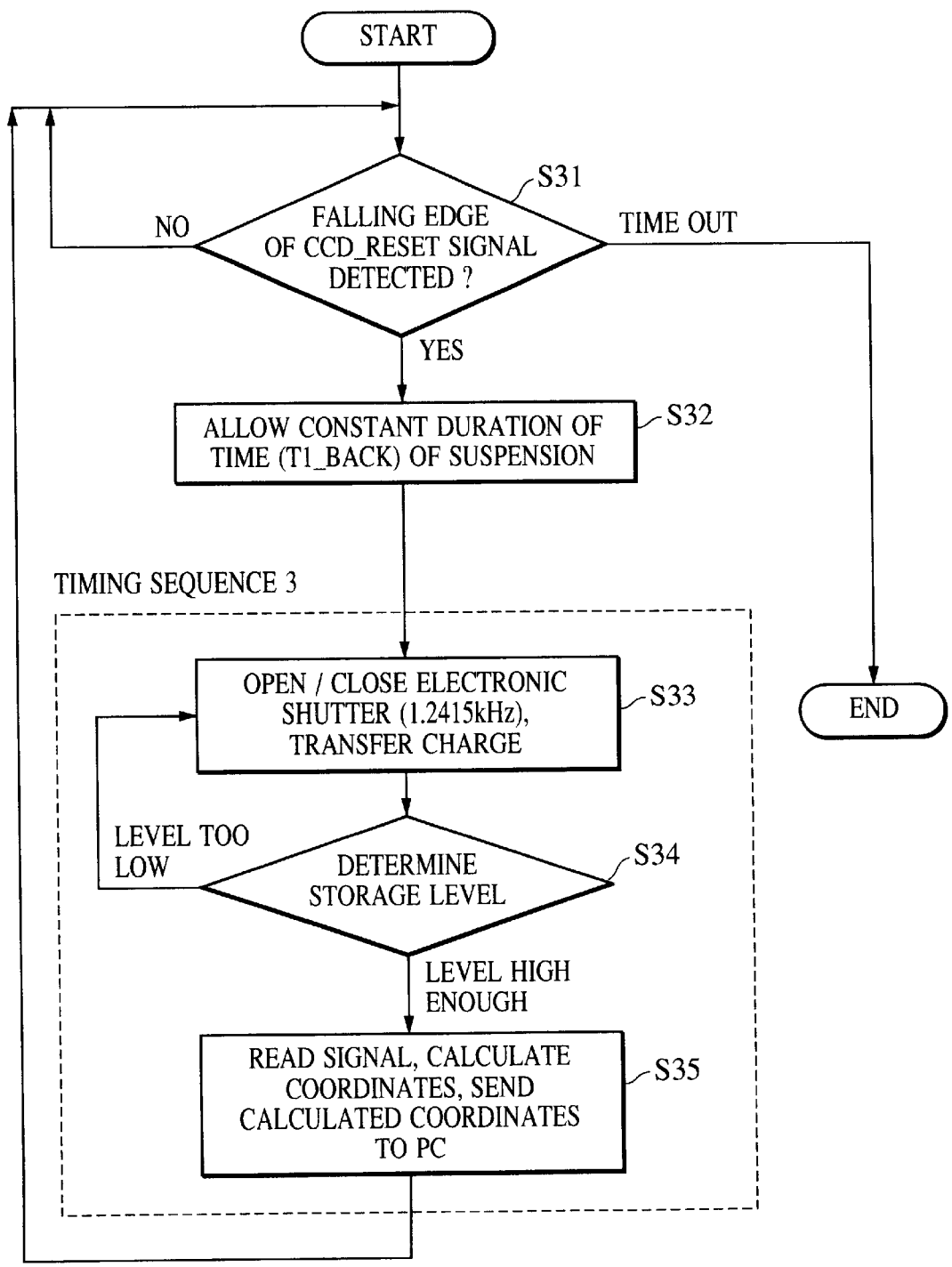
FIG. 24 is a flow diagram showing the timing sequence 2 in the first example of the first embodiment of the present invention.

The timing sequences 1 and 2 in this setting are shown in FIG. 18 and FIG. 19. Flow diagrams for the timing sequences 1 and 1 are shown in FIG. 23 and FIG. 24.

Figure 21:
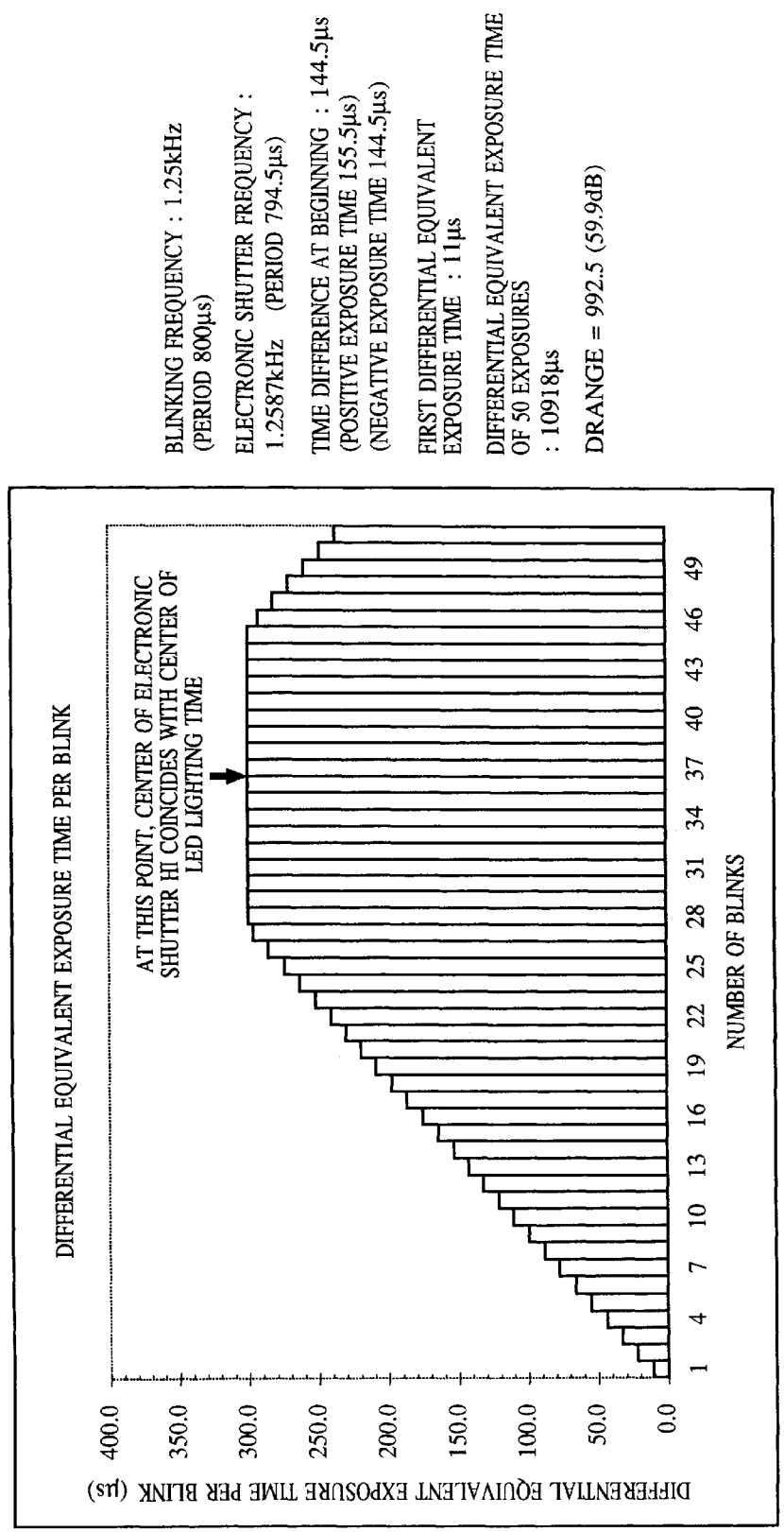
FIG. 21 is a diagram plotting a differential equivalent exposure time in the first example of the first embodiment of the present invention.

In this setting, the "differential equivalent exposure time" is 11 μs at the beginning of each timing sequence, and the process subsequent thereto is shown in FIG. 21.

Referring to FIG. 21, the ordinate represents the differential equivalent exposure time per blink, and the abscissa represents elapsed time (a blinking count). As shown, the timing of the blinking and the electronic shuttering gradually approach each other, from a first blink, until the blinking and the electronic shuttering fully overlap each other over a duration of time from a 28th blink to a 48th blink.

From a 46th blink thereafter, the blinking timing gradually shifts in the opposite direction from the direction taken in the beginning.

Specifically, the center of the lighting time is aligned with the center of the high-state of the electronic shutter at the moment between a 36th blink and a 37th blink.

In this embodiment, the number of blinks is controlled depending on the strength of the directed light beam. As already discussed, circulating storage is stopped at the moment the storage amount of charge reaches a predetermined value. This mechanism is applied to the improved method (see FIG. 21).

When a strong light beam is directed with the pointer 1 too closely placed, the storage operation ends with a single cycle of blinking. In this case, the differential equivalent exposure time is as short as 11 μs, i.e., equivalent to only the first bar in the bar graph in FIG. 21.

When a weak light beam is directed with the pointer 1 pointed at a slant angle, for example, the storage operation is continued until the last blinking cycle. In this case, the differential equivalent exposure time is as long as 10918 μs, i.e., equivalent to all bars combined in the bar graph in FIG. 21.

Depending on the light intensity, the differential equivalent exposure time is varied from 11 μs to 10918 μs, within a multiplication ratio of 992.5. In other words, sensitivity changes within a range from 1 to 992.5 times.

This dynamic range improvement is the object of the present invention.

The resulting dynamic range is approximately 60 dB, which is satisfactory in almost all applications.

In this embodiment, the time at which the center of the lighting time is aligned with the center of the high-state of the electronic shutter comes to the middle between the 36th blink and the 37th blink. This time is set so that the sum of the differential equivalent exposure time until the last blinking cycle becomes maximized or becomes close to a maximum.

Since the electronic shutter period including the positive exposure time is almost identical to the electronic shutter period including the negative exposure time in this embodiment, storage charge due to external interfering light, i.e., noise is removed when a predetermined output signal is generated based on the stored charge difference between the two electronic shutter periods. A high S/N ratio thus results.

As already discussed, the deviation between the blinking period of the light emitter element and the period of the electronic shutter is caused by modifying the period of the electronic shutter while the blinking period of the light emitter element is fixed. It is important to cause a deviation between the two periods. To this end, the blinking period of the light emitter element may be changed while the period of the electronic shutter is fixed.

The processing of signals, such as for the differential equivalent exposure time, is all performed by the ring CCD. Alternatively, the signal processing subsequent to the photoelectric conversion is also performable using a software program.

<Second Example of the First Embodiment for further Expanding Dynamic Range>

As already discussed, the present invention is directed to a method for expanding dynamic range to the strength of incident light. A second example of the first embodiment of the method for expanding dynamic range will now be discussed.

Figure 28:
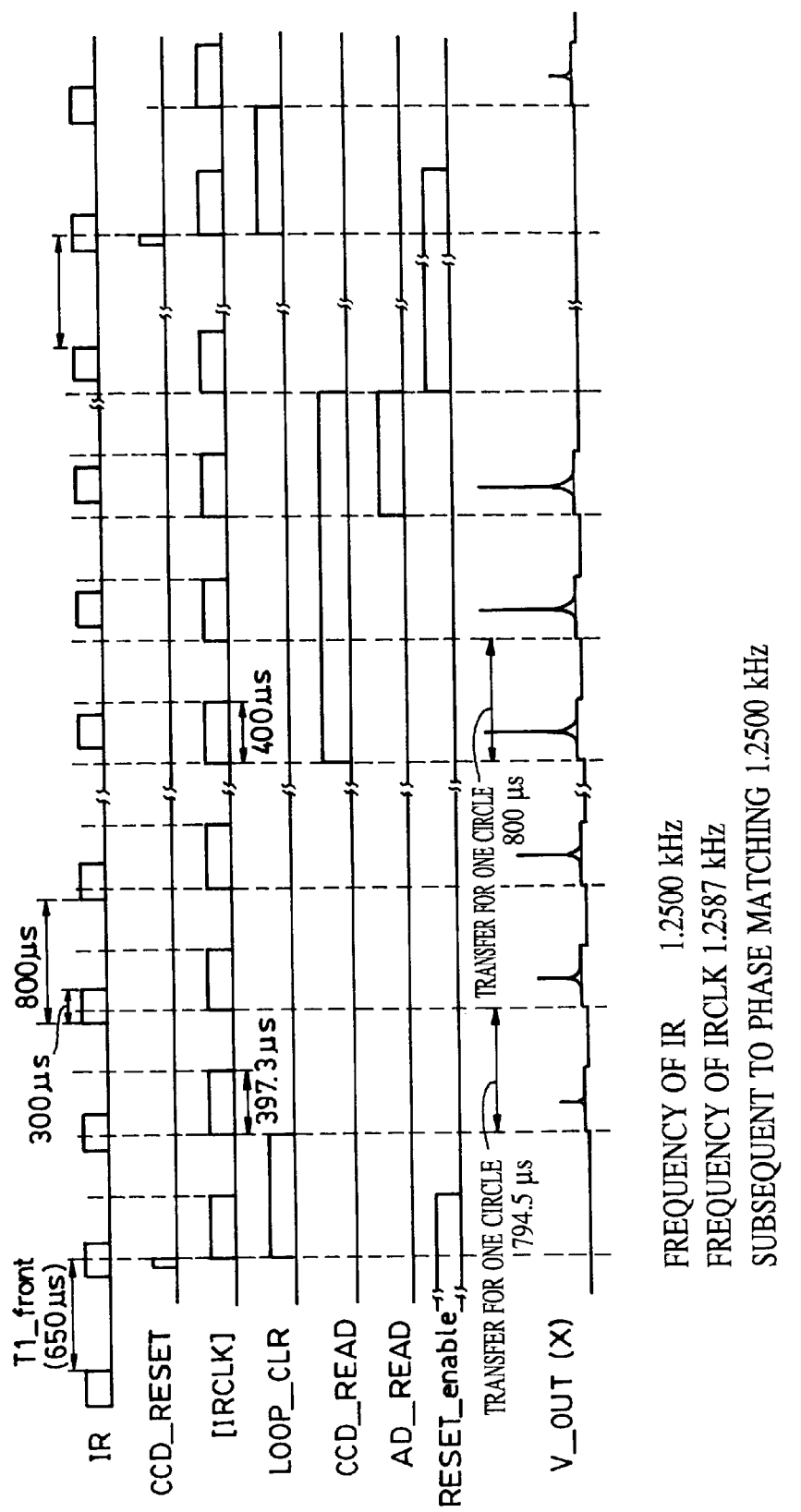
FIG. 28 shows a timing sequence 1 (of shutter timing targeting type) in a second example of the first embodiment of the present invention.
Figure 29:
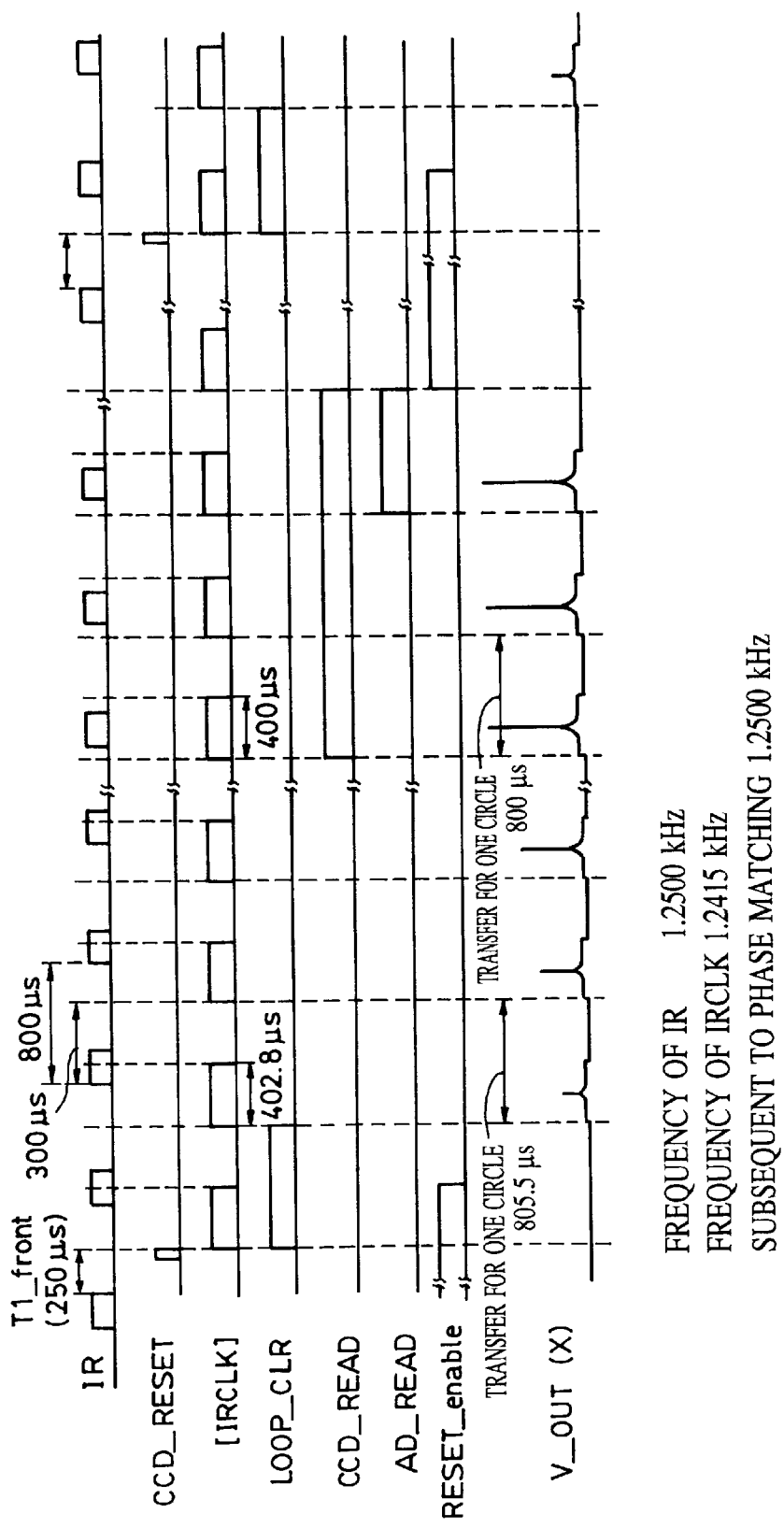
FIG. 29 shows a timing sequence 2 (of light timing targeting type) in the second example of the first embodiment of the present invention.

Timing sequences 1 and 2 in the second example are shown in FIG. 28 and FIG. 29. In the second example of the first embodiment, the external control of the ring CCD and the synchronization between the ring CCD and the LED blinking remain largely the same as those in the known devices.

The difference is that a storage quantity per blinking cycle is reduced by deviating the signal "IRCLK" of the electronic shutter from the signal "LED_IR" (or "IR") in phase by a predetermined amount at the beginning of one coordinate sampling, and that the signal "IRCLK" and the signal "LED_IR" (or "IR") are aligned in phase immediately prior to the end of the one coordinate sampling by slightly deviating the signal "IRCLK" from the signal "LED_IR" (or "IR") in frequency.

The frequency of the signal "IRCLK" is switched to a frequency to that of the signal "LED_IR" (or "IR") at the moment the signal "IRCLK" and the signal "LED_IR" are in phase. Storage efficiency subsequent to that moment is thus prevented from being lowered.

Specifically, the timing sequence is set to shift the high state of the electronic shutter forward to the beginning of the lighting time or backward to the end of the lighting time so that a difference, which is obtained by subtracting an overlapping duration of time of a first lighting time of the light emitter element 6 and a low state of the electronic shutter from an overlapping duration of time of the first lighting time of the light emitter element 6 and a high state of the electronic shutter, is equal to or less than one-tenth the lighting time. Furthermore, in the timing sequence, the frequency of the electronic shutter is set so that the center of the lighting time of the light emitter element 6 coincides with the center of the high state of the electronic shutter period at a blinking cycle count that falls within a range not more than the maximum number of blinking counts in each coordinate sampling and not less than half the maximum number of blinking counts.

The frequency of the signal "IRCLK" is switched to a frequency to that of the signal "LED_IR" (or "IR") at the moment the center of the lighting time of the light emitter element 6 of the pointer 1 coincides with the center of the high-state of the electronic shutter and at the moment the signal "IRCLK" and the signal "LED_IR" (or "IR") are in phase. This arrangement prevents the period of the lighting time and the period of the electronic shuttering from being deviated from each other subsequent to the above-mentioned moment, thereby keeping storage efficiency from being lowered. By substantially lowering the minimum sensitivity, the "expansion of dynamic range through storage count control" is promoted even more.

FIG. 20 shows the shutter timing on which improved methods are based. There are two types of improved methods available: a shutter timing targeting method and a lighting timing targeting method.

In the shutter timing targeting method, the phase of the lighting electronic shutter is shifted backward at the beginning of the one coordinate sampling to slightly shorten the period of the electronic shutter. In the lighting timing targeting, the phase of the lighting electronic shutter is shifted forward at the beginning of the one coordinate sampling to slightly lengthen the period of the electronic shutter. In either case, the frequency of the lighting electronic shutter is changed to a frequency equal to that of the blinking frequency of the pointer 1 when the lighting electronic shutter and the lighting period are in phase. Thus, an in-phase relation is thus assured at the timing sequence in progress (at an in-phase point) and at the end of the timing sequence.

In this specification, a "positive exposure time" is defined as a high-level portion of the signal "IRCLK" with the light emitter element 6 (LED) lighting, a "negative exposure time" is defined as a low-level portion of the signal "IRCLK" with the LED lighting. As for a differential output of the ring CCD, a "differential equivalent exposure time" is defined as follows: the "differential equivalent exposure time"="positive exposure time"−"negative exposure time."

During each of the positive exposure time and the negative exposure time, a signal charge is generated in the photoelectric converter (pixel) i in the ring CCD with the light emitter element lighting. During the positive exposure time, the signal charge is transferred to the cell 2$i$ through the storage unit 41 and the hold section (a) and stored in the cell 2$i$ in the circulating charge transfer path. During the negative exposure time, the signal charge is transferred to the cell 2$i$-1 through the storage unit 41 and the hold section (b) and stored in the cell 2$i$-1 in the circulating charge transfer path.

In this embodiment, the timing of the blinking and the electronic shutter is set up as below (see FIG. 28 and FIG. 29).

1) Blinking of the LED
   Frequency of the LED: 1.2500 kHz (period 800 $\mu$m)
   Lighting pulse width of the LED: 300 $\mu$s
2) Electronic Shutter
   a) Shutter timing targeting method
      Frequency of electronic shutter IRCLK: 1.2587 kHz (period 794.5 $\mu$s)
      High-level time of IRCLK: 397.3 $\mu$s
      T1_front=650 s
      Initial "positive exposure time": 155.5 $\mu$s (shifted backward to shutter timing)
   b) Lighting timing targeting method
      Frequency of electronic shutter IRCLK: 1.2415 kHz (period 805.5 $\mu$s)
      High-level time of IRCLK: 402.8 $\mu$s
      T1_back=250 $\mu$s
      Initial "positive exposure time": 155.5 $\mu$s (shifted forward to shutter timing)

3) Electronic shuttering subsequent to phase matching
   Frequency of electronic shutter IRCLK: 1.200 kHz (period 800 $\mu$s)
   High-level time of IRCLK: 400 $\mu$s
   Differential equivalent exposure time: 300 $\mu$s (shutter period including LED lighting time)

Figure 31:
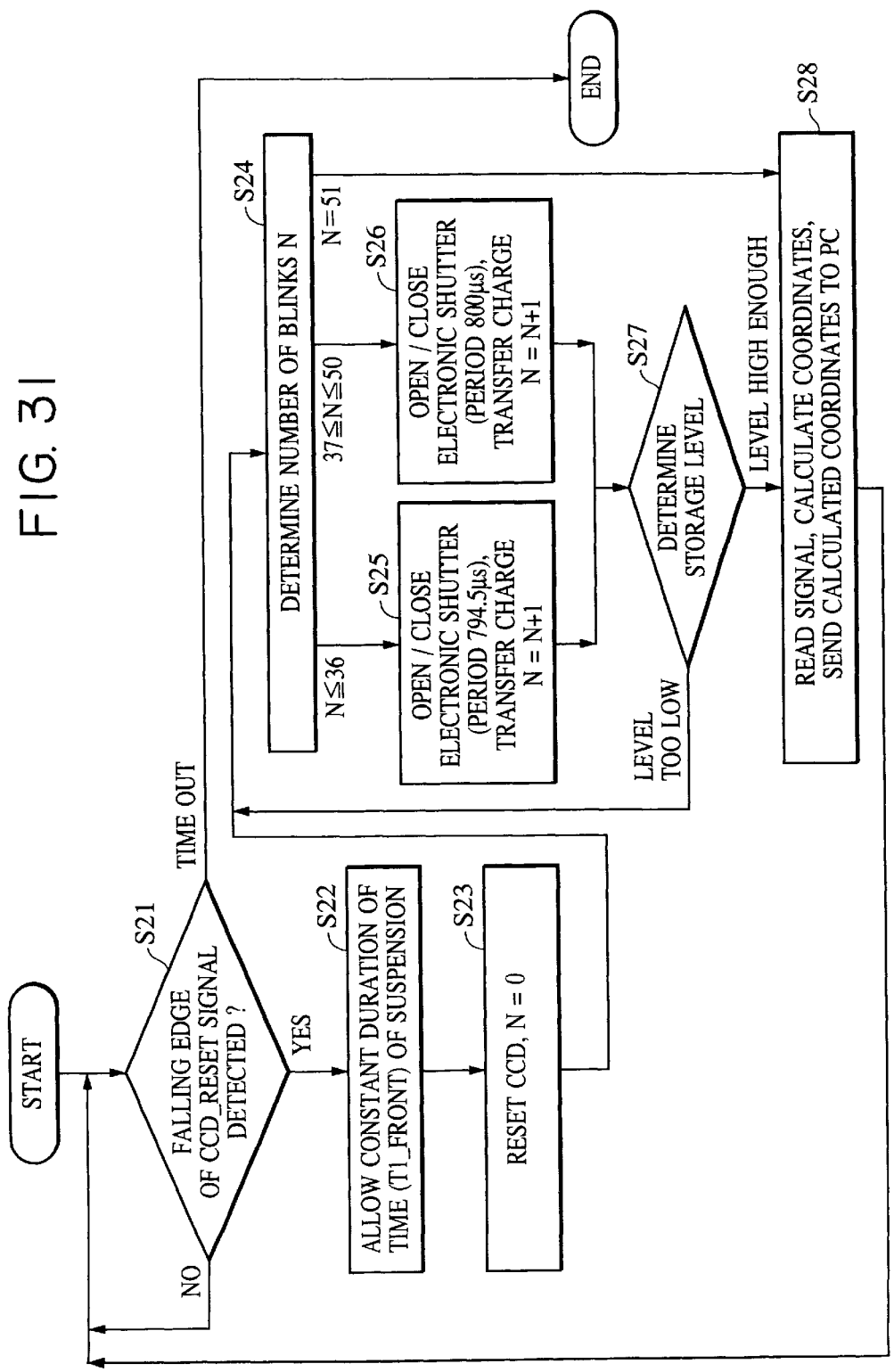
FIG. 31 is a flow diagram showing the timing sequence 1 in the second example of the first embodiment of the present invention.

The timing sequences 1 and 2 in this setting are shown in FIG. 28 and FIG. 29. Flow diagrams for the timing sequences 1 and 1 are shown in FIG. 31 and FIG. 32.

In this setting, the "differential equivalent exposure time" is 11 $\mu$s at the beginning of each timing sequence. The process subsequent to the first blink is shown in FIG. 30.

Figure 30:
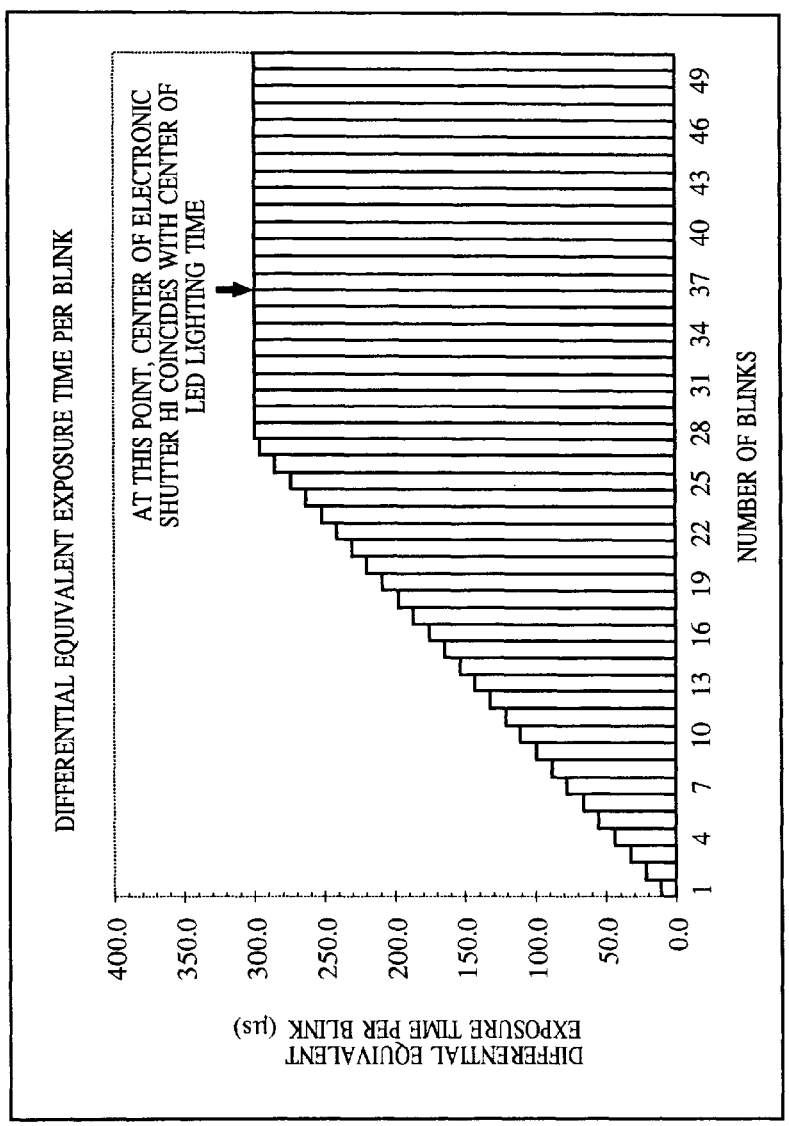
FIG. 30 is a diagram plotting a differential equivalent exposure time in the second example of the first embodiment of the present invention.

Referring to FIG. 30, the ordinate represents the differential equivalent exposure time per blink, and the abscissa represents elapsed time (a blinking count). As shown, the timing of the blinking and the electronic shuttering gradually approach each other, from a first blink, until the blinking and the electronic shuttering fully overlap each other over a duration of time from a 28th blink to a 45th blink. The center of the lighting time is aligned with the center of the high-state of the electronic shutter at the moment between a 36th blink and 37th blink.

From a 46th blink thereafter, the blinking timing gradually shifts in the opposite direction from the direction taken in the beginning. In this embodiment, the frequency of the electronic shutter is switched to a frequency identical to that of the blinking of the pointer 1 from the 37th blink. In this way, the shifting of the blinking timing is prevented. The in-phase state between the electronic shutter and the blinking timing is thus maintained until the end of the one coordinate sampling.

In this embodiment, the number of blinks is controlled depending on the strength of the directed light beam. As already discussed, circulating storage is stopped at the moment the storage amount of charge reaches a predetermined value. This mechanism is applied to the improved method (see FIG. 30).

When a strong light beam is directed with the pointer 1 placed too closely, the storage operation ends with a single cycle of blinking. In this case, the differential equivalent exposure time is as short as 11 $\mu$s, i.e., equivalent to only the first bar in the bar graph in FIG. 30.

When a weak light beam is directed with the pointer 1 pointed at a slant angle, for example, the storage operation is continued until the last blinking cycle. In this case, the differential equivalent exposure time is as long as 11058 $\mu$s, i.e., equivalent to all bars combined in the bar graph in FIG. 30.

Depending on the light intensity, the differential equivalent exposure time is varied from 11 $\mu$s to 11058 $\mu$s, within a multiplication ratio of 1005. In other words, sensitivity changes within a range from 1 to 1005 times.

This dynamic range improvement is the object of the present invention.

The resulting dynamic range is approximately 61 dB, which is satisfactory in almost all applications.

In this embodiment, the time at which the center of the lighting time is aligned with the center of the high-state of the electronic shutter comes to the middle between the 36th blink and the 37th blink. This time setting, namely, the setting a slope of the bar graph in the earlier portion thereof in FIG. 30, is performed so that dynamic range is selected at a fine step on the minimum sensitivity side.

The frequency of the electronic shuttering is set to be equal to the blinking frequency at the 37th blink thereafter. The in-phase state between the electronic shutter and the blinking operation is maintained until the end of the one coordinate sampling. Therefore, the sum of the differential equivalent exposure time until the last blinking cycle becomes maximized or becomes close to a maximum.

Since the electronic shutter period including the positive exposure time is almost identical to the electronic shutter period including the negative exposure time in this embodiment, storage charge due to external interfering light, i.e., noise is removed when a predetermined output signal is generated based on the stored charge difference between the two electronic shutter periods. A high S/N ratio thus results.

As already discussed, the deviation between the blinking period of the light emitter element and the period of the electronic shutter is caused by modifying the period of the electronic shutter while the blinking period of the light emitter element is fixed. It is important to cause a deviation between the two periods. To this end, the blinking period of the light emitter element may be changed while the period of the electronic shutter is fixed.

The processing of signals, such as for the differential equivalent exposure time, is all performed by the ring CCD. Alternatively, the signal processing subsequent to the photoelectric conversion may be performed using a software program.

Second Embodiment

Figure 25:
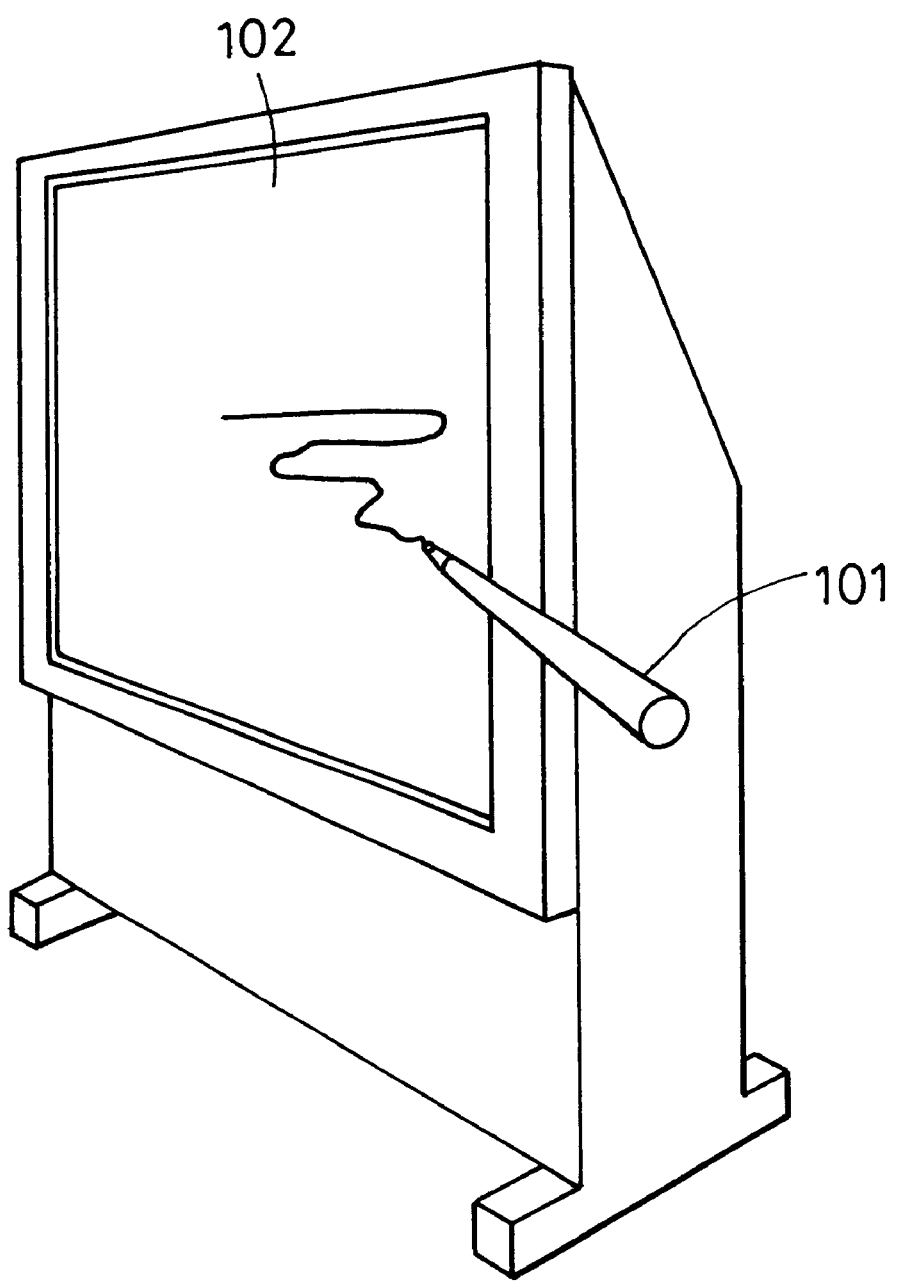
FIG. 25 is a perspective view showing the concept of a second embodiment of the present invention.
Figure 26:
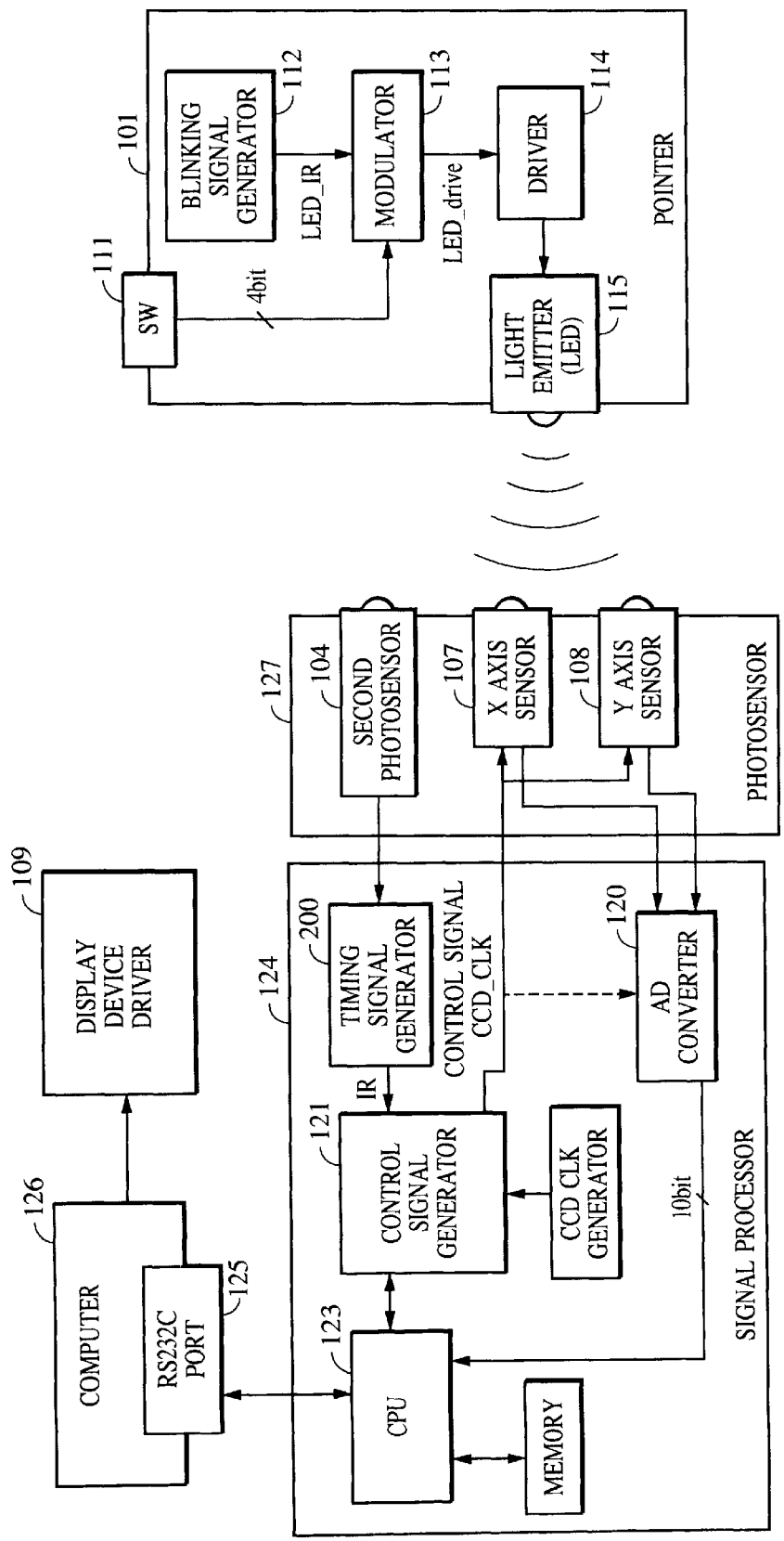
FIG. 26 is a block diagram generally showing the construction of the second embodiment of the present invention.

FIG. 25 is a perspective view showing a coordinate input device in accordance with a second embodiment of the present invention. FIG. 26 is a block diagram of the coordinate input device.

The coordinate input device includes a pointer 101 which forms a light spot 103 on a screen 102 serving as a coordinate input surface, a photosensor unit 127 which detects position coordinates of the light spot 103 generated on the screen 102, and a signal processor 124 which controls the photosensor unit 127 and calculates coordinate information from a signal into which the light spot 103 is photoelectrically converted by the photosensor unit 127.

Figure 27:
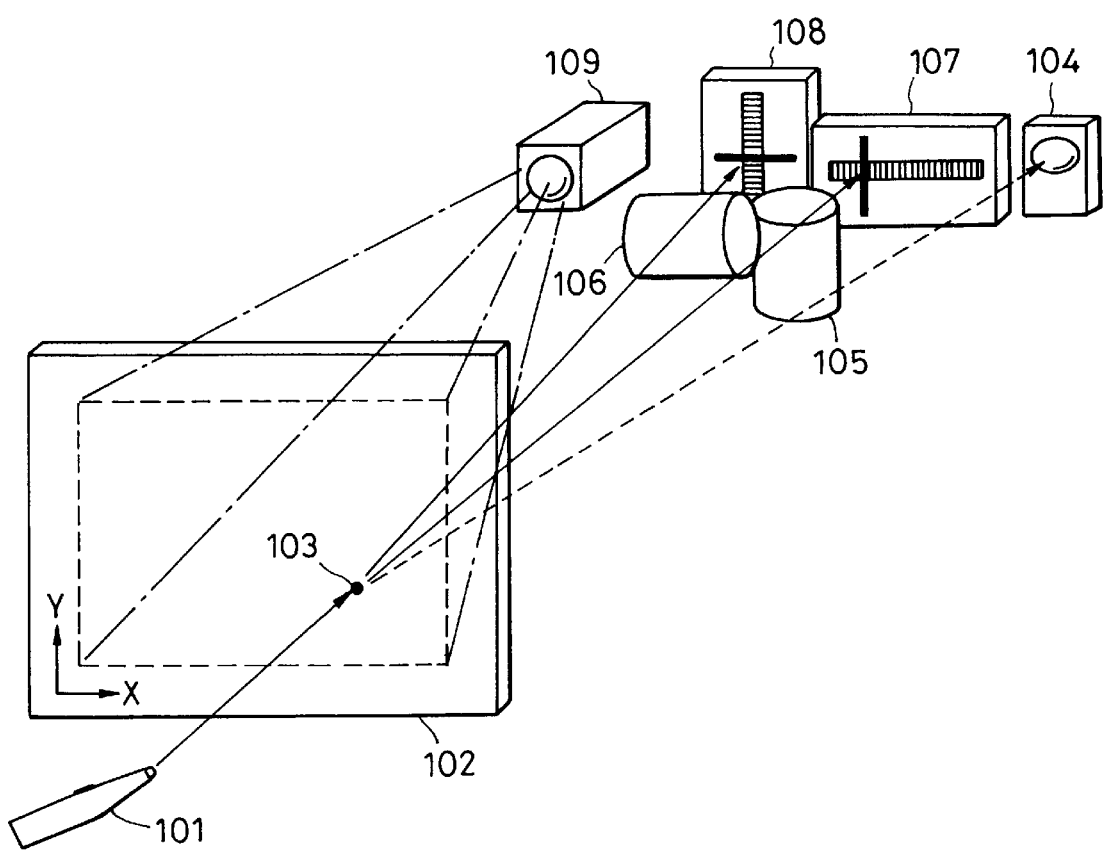
FIG. 27 illustrates the layout of a pointer, a screen, sensors and lenses in the second embodiment of the present invention.

FIG. 27 shows a projection-type display apparatus 109 which presents an image on the screen 102 while echoing back coordinate position information (of a cursor and a path, for example) indicated by the pointer 101.

The pointer 101 includes a light emitter element 115 such as a semiconductor laser or an LED for directing an optical beam, a blinking signal generator 112 and a modulator 113 for producing an emission pattern, a driver 114 for driving the light emitter element 115, and a switch bank 111 for inputting accompanying information such as for pen-up and pen-down operations.

The photosensor unit 127 includes a line sensor 107, a cylindrical lens 105 for focusing a light spot on a pixel array of the line sensor 107, a line sensor 108, a cylindrical lens 106 for focusing a light spot on a pixel array of the line sensor 108, and a second photosensor element 104.

The line sensor 107 detects the position of the light spot 103 in the X direction, and the line sensor 108 detects the position of the light spot in the Y direction. The line sensors 107 and 108 are so-called ring CCDs.

Signals received by the line sensors 107 and 108 are converted into digital signals by an AD converter 120. A CPU 123 calculates coordinate information of the light spot 103 from the digital signals. The coordinate information is then sent to a host computer 126. The line sensors 107 and 108 are controlled in accordance with a timing sequence generated by a control signal generator 121.

The second photosensor element 104 is a single-pixel photoelectrical converter. This photosensor obtains time axis information of light of the light spot 103.

The signal obtained by the second photosensor element 104 is subjected to bandpass filtering, full-wave rectifying, smoothing, and binarizing in a timing signal generator 200, and becomes a timing signal "IR." The timing signal "IR" is then sent to a control signal generator 121.

The control signal generator 121 detects the accompanying information (SW information on the pointer 101), by determining the signal "IR" under predetermined conditions. The control signal generator 121 detects the falling edge of the signal "IR," generates a reset signal "RESET" after a predetermined duration of time, starts the timing sequence in response to the falling edge of the signal "IR" as a trigger. The control signal generator 121 then sends the timing sequence to the line sensors 107 and 108.

The timing sequence starts over each time the coordinate information for a single point is captured. As in the first embodiment, the frequency of the electronic shuttering on the receiver side is deviated from the blinking frequency on the emitter side by a predetermined ratio. In the beginning of the one coordinate sampling, the lighting time on the emitter side is shifted from the start time of the high-state of the electronic shutter by a predetermined phase.

Like the first embodiment, the second embodiment of the present invention also provides sufficiently wide dynamic range, in comparison with the known devices.

In the second embodiment, the sensitivity of the photoreceiver side is increased as much as dynamic range is increased. By widening dynamic range on a low sensitivity side, signal inputting becomes possible even if the pointer 101 is spaced apart from the screen 102.

The present invention thus provides the photosensing position detector, the coordinate input device, and the coordinate input/output device, each having a wide dynamic range.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A photodetector comprising:
   photoreceiving means for receiving a light beam that blinks a plurality of times per detection period and for converting the received light beam into an output signal; and
   signal processing and controlling means for controlling the photoreceiving means so that the output signal, that is output in response to the received light beam per blinking cycle of the light beam, increases in strength as a blinking cycle count, increases in each detection period.

2. A photodetector according to claim 1, wherein the photoreceiving means constitutes an electronic shutter which operates with a constant period substantially equal to a blinking period of the light beam, each period of the electronic shutter including a first electronic shutter time duration and a second electronic shutter time duration, and
   wherein the signal processing and controlling means controls the photoreceiving means in response to a difference between a duration of time during which a lighting time of the blinking light beam overlaps the first electronic shutter time duration and a duration of time during which the lighting time of the blinking light beam overlaps the second electronic shutter time duration.

3. A photodetector according to claim 1, wherein the signal processing and controlling means reduces a deviation between the lighting time in the blinking cycle and the first electronic shutter time duration as the blinking cycle count increases in each detection period.

4. A photodetector according to claim 1, the signal processing and controlling means comprises control means which stops a signal addition and enlarging process in the signal processing and controlling means when a maximum value of a stored quantity of the output signal reaches a predetermined value.

5. A photodetector according to claim 1, wherein the photoreceiving means and the signal processing and controlling means are formed of a ring CCD.

6. A photodetector according to claim 2, wherein the frequency of the electronic shutter is switched to a same frequency as a frequency of the blinking light beam at a point at which a center of the lighting time of a blinking cycle coincides with a center of the first electronic shutter time duration.

7. A photosensing position detector comprising:
   a line sensor, formed of pixels arranged in a line, for receiving a light beam that blinks a plurality of times per detection period;
   signal processing and controlling means which controls the line sensor so that an output signal of the line sensor in response to the received light beam per blinking cycle of the light beam increases in strength as a blinking cycle count increases in each detection period; and
   determining means which determines, as a photosensing position, a position of a pixel that results in a maximum value of the output signals.

8. A photosensing position detector according to claim 7, comprising an electronic shutter which operates with a constant period substantially equal to a blinking period of the light beam, each period of the electronic shutter including a first half of the period as a first electronic shutter time duration and a second half period as a second electronic shutter time duration, and
   wherein the output signal is formed based on a difference between a charge that is photoelectrically converted and then stored throughout a duration of time during which a lighting time of the blinking light beam overlaps the first electronic shutter time duration and a charge that is stored photoelectrically converted and then stored throughout a duration of time during which the lighting time of the blinking light beam overlaps the second electronic shutter time duration.

9. A photosensing position detector according to claim 8, wherein the signal processing and controlling means reduces a deviation between the lighting time in the blinking cycle and the first electronic shutter time duration as the blinking cycle count increases in each detection period.

10. A photosensing position detection period to sensing position detector according to claim 7, the signal processing and controlling means comprises control means which stops a signal addition and storage process in the signal processing and controlling means when a maximum value of a stored quantity of the output signal reaches a predetermined value.

11. A photosensing position detector according to claim 8, wherein the line sensor and the signal processing and controlling means are formed of a ring CCD.

12. A photosensing position detector according to claim 8, wherein a frequency of the electronic shutter is set so that the lighting time in the blinking period equals the first electronic shutter time duration at a blinking cycle counter that falls within a range not more than a maximum number of blinking counts and not less than half the maximum number of blinking counts in each detection period.

13. A photosensing position detector according to claim 8, wherein a difference between an overlapping duration of time of the lighting time for the first blinking cycle and the first electronic shutter time duration and an overlapping duration of time of the lighting time for the first blinking cycle and the second electronic shutter time duration is one-tenth the lighting time.

14. A photosensing position detector according to claim 8, wherein the frequency of the electronic shutter is switched to a same frequency as the frequency of the blinking light beam at a point at which a center of the lighting time of the blinking cycle coincides with a center of the first electronic shutter time duration.

15. A coordinate input device comprising a photosensing position detector according to one of claims 7 through 14, wherein the photosensing position detector detects a position of a light source that blinks, and converts the position of the light source into coordinates.

16. A coordinate input/output apparatus comprising the coordinate input device according to claim 15 and a display device for displaying the coordinates of the light source.

17. A control method of controlling a photodetector, comprising:
   a photosensing step of converting a light beam that blinks a plurality of times per detection period into an output signal, and
   a signal processing and controlling step of controlling the photosensing step so that the output signal in response to the received light beam per blinking cycle of the light beam increases in strength as a blinking cycle count increases in each detection period.

18. A control method of controlling a photosensing position detector, comprising:
   a signal processing and controlling step which controls an output signal from a line sensor, formed of pixels arranged in a line, for receiving a light beam that blinks a plurality of times per detection period, so that the output signal in response to the received light beam per blinking cycle of the light beam increases in strength as a blinking cycle count increases in each detection period, and
   a determining step which determines, as a photosensing position, a position of a pixel that results in a maximum value of the output signal.

* * * * *

UNITED STATES PATENT AND TRADEMARK OFFICE
CERTIFICATE OF CORRECTION

PATENT NO. : 6,740,860 B2
DATED : May 25, 2004
INVENTOR(S) : Kiwamu Kobayashi

It is certified that error appears in the above-identified patent and that said Letters Patent is hereby corrected as shown below:

<u>Title page,</u>
Item [56], References Cited, FOREIGN PATENT DOCUMENTS, "8233571" should read -- 8-2-33571 --.
Item [57], ABSTRACT,
Line 3, "coverts" should read -- converts --.

<u>Column 6,</u>
Line 13, "DRANG" should read -- DRANGE --.

Signed and Sealed this

Twenty-seventh Day of September, 2005

JON W. DUDAS
*Director of the United States Patent and Trademark Office*